(12) United States Patent
Satoh et al.

(10) Patent No.: US 12,735,870 B2
(45) Date of Patent: Sep. 15, 2026

(54) WORK MACHINE

(71) Applicant: SUMITOMO HEAVY INDUSTRIES, LTD., Tokyo (JP)

(72) Inventors: Keisuke Satoh, Kanagawa (JP); Ayano Shinato, Kanagawa (JP); Homare Shibata, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 18/822,833

(22) Filed: Sep. 3, 2024

(65) Prior Publication Data

US 2025/0075470 A1 Mar. 6, 2025

(30) Foreign Application Priority Data

Sep. 6, 2023 (JP) ................................ 2023-144305

(51) Int. Cl.

| | |
|---|---|
| ***B60R 21/0134*** | (2006.01) |
| ***E02F 9/24*** | (2006.01) |
| ***E02F 9/26*** | (2006.01) |
| ***G01S 13/931*** | (2020.01) |
| ***G01S 17/931*** | (2020.01) |
| ***G05B 13/02*** | (2006.01) |
| ***G08G 1/16*** | (2006.01) |

(52) U.S. Cl.
CPC ................ *E02F 9/24* (2013.01); *E02F 9/261* (2013.01); *G05B 13/0265* (2013.01)

(58) Field of Classification Search
CPC ......... E02F 9/24; E02F 9/261; G05B 13/0265
See application file for complete search history.

(56) References Cited

U.S. PATENT DOCUMENTS 8,579,480 B2 * 11/2013 Willeke ................. B64D 47/04 362/540
9,020,666 B2 * 4/2015 Ohtomo .................. G01S 19/15 701/15
10,254,767 B1 * 4/2019 Kamon .................. B64U 70/97
10,831,213 B2 * 11/2020 Kean .................... G05D 1/0214
10,843,622 B2 * 11/2020 Lee ...................... G05D 1/0246
11,315,085 B2 * 4/2022 Candel ...................... B65F 3/02
11,651,249 B2 * 5/2023 Azmandian .............. G06N 5/04 706/12
11,879,231 B2 * 1/2024 Kean ....................... E02F 3/434
11,879,771 B2 * 1/2024 Oren ........................ G01G 3/14
11,904,757 B2 * 2/2024 Takori .................... B60Q 1/143
12,000,108 B2 * 6/2024 Iwasaki ................... E02F 9/262
12,050,465 B2 * 7/2024 Iwamoto .......... G06Q 10/06312
12,129,154 B2 * 10/2024 Oren ...................... G01G 19/18
12,286,767 B2 * 4/2025 Wu ....................... E02F 9/2282
12,325,355 B2 * 6/2025 Armbruster ............ B60Q 1/525
(Continued)

FOREIGN PATENT DOCUMENTS

CN 108382996 2/2020
JP 2017-193928 10/2017
JP 2018-084084 5/2018

*Primary Examiner* — Quang Pham
(74) *Attorney, Agent, or Firm* — IPUSA, PLLC

(57) ABSTRACT

A work machine includes an attachment and a control device. The control device is configured to specify a hazardous zone in which a degree of hazard increases when an object falls during an operation of the attachment to lift and move the object, and make the specified hazardous zone visually recognizable.

10 Claims, 8 Drawing Sheets

(56) References Cited

U.S. PATENT DOCUMENTS 12,338,105 B2 * 6/2025 Cohen .................... B66C 13/46
12,460,389 B2 * 11/2025 Nishi .................... E02F 9/261
12,467,238 B2 * 11/2025 Onodera .................... E02F 3/435
12,624,519 B2 * 5/2026 Okada .................... E02F 3/439
12,624,520 B2 * 5/2026 Sakisaka .................... E02F 3/844
12,624,526 B2 * 5/2026 Danguchi .................... E02F 9/2033
2013/0187785 A1 * 7/2013 McIntosh .................... F16P 3/144 340/686.6
2014/0046632 A1 * 2/2014 Solihin .................... E04G 21/3204 703/1
2016/0280393 A1 * 9/2016 Mouton .................... B64D 45/08
2017/0096797 A1 * 4/2017 Robertson .................... E02F 9/2041
2017/0116867 A1 * 4/2017 Cherepinsky .................... B64C 25/34
2018/0174460 A1 * 6/2018 Jung .................... G08G 1/16
2018/0346294 A1 * 12/2018 Shely .................... B66C 23/905
2019/0220677 A1 * 7/2019 Lipson .................... G06V 20/588
2019/0389057 A1 * 12/2019 Chae .................... G06V 20/20
2020/0048871 A1 * 2/2020 Nishizawa .................... B60Q 9/008
2020/0156533 A1 * 5/2020 Lee .................... B60Q 1/507
2020/0361011 A1 * 11/2020 Alfthan .................... A01G 23/08
2020/0386605 A1 * 12/2020 Oren .................... B66C 13/40
2021/0109209 A1 * 4/2021 Li .................... G01S 7/417
2021/0233186 A1 * 7/2021 Cohen .................... G06Q 10/06316
2022/0136215 A1 * 5/2022 Shiratani .................... E02F 3/962 701/50
2022/0185643 A1 * 6/2022 Messina .................... E02F 9/264
2022/0227604 A1 * 7/2022 Chen .................... B66C 13/063
2022/0315396 A1 * 10/2022 Matsushita .................... B66C 23/88
2022/0324679 A1 * 10/2022 Benzing .................... B66C 13/16
2022/0333355 A1 * 10/2022 Um .................... G05D 1/0038
2023/0009081 A1 * 1/2023 Paripally .................... G06V 40/10
2023/0257241 A1 * 8/2023 Benzing .................... B66C 13/16 212/276
2023/0393591 A1 * 12/2023 Gordon .................... G05D 1/106
2024/0018750 A1 * 1/2024 Nishi .................... E02F 9/2282
2024/0026651 A1 * 1/2024 Nishi .................... E02F 9/2054
2024/0104470 A1 * 3/2024 Cohen .................... G06Q 10/0633
2024/0209591 A1 * 6/2024 Honda .................... E02F 3/437
2024/0318402 A1 * 9/2024 Honda .................... E02F 3/439
2024/0425332 A1 * 12/2024 Butcher .................... B66C 15/065
2025/0163678 A1 * 5/2025 Ito .................... E02F 3/437
2025/0215666 A1 * 7/2025 Matsuhashi .................... E02F 9/262
2025/0215667 A1 * 7/2025 Matsuhashi .................... E02F 9/261
2026/0009206 A1 * 1/2026 Kim .................... E02F 9/26
2026/0015831 A1 * 1/2026 Fullenkamp .................... E02F 9/262
2026/0015834 A1 * 1/2026 Dianics .................... E02F 9/24
2026/0022540 A1 * 1/2026 Ozaki .................... E02F 9/26
2026/0022926 A1 * 1/2026 Reimann .................... G01B 5/012
2026/0028798 A1 * 1/2026 Naito .................... E02F 9/2083
2026/0028802 A1 * 1/2026 Jerauld .................... E02F 9/261
2026/0035886 A1 * 2/2026 Sekiguchi .................... E02F 9/245
2026/0036947 A1 * 2/2026 Sarkissian .................... G05B 13/0265
2026/0037496 A1 * 2/2026 Narita .................... G06F 16/2272
2026/0042367 A1 * 2/2026 Kuwahara .................... B60L 53/18
2026/0049461 A1 * 2/2026 Tokita .................... E02F 9/2029
2026/0055578 A1 * 2/2026 Kenkel .................... E02F 9/2033
2026/0055579 A1 * 2/2026 Ogawa .................... E02F 9/205
2026/0062887 A1 * 3/2026 Fukuda .................... E02F 3/968
2026/0062891 A1 * 3/2026 Jeong .................... E02F 9/205
2026/0070434 A1 * 3/2026 Ogata .................... B60L 50/70
2026/0071409 A1 * 3/2026 Ichikawa .................... E02F 9/262
2026/0071412 A1 * 3/2026 Murakami .................... E02F 9/261
2026/0073084 A1 * 3/2026 Hayakawa .................... E02F 9/261
2026/0091678 A1 * 4/2026 Kawaguchi .................... B60K 35/29
2026/0094111 A1 * 4/2026 Nishi .................... G06Q 10/0833
2026/0098398 A1 * 4/2026 Safari-Shad .................... E02F 9/262
2026/0099946 A1 * 4/2026 Brüderle .................... E02F 9/261
2026/0103875 A1 * 4/2026 Wuisan .................... E02F 9/262
2026/0116302 A1 * 4/2026 Oenema .................... B60R 1/27

* cited by examiner

SYS
REMOTE OPERATION ROOM
RC
LIGHTING DEVICE
300
200
100
101
70 (70B)
70 (70R)
70 (70L)
70 (70F)
11
3
71
10
73
T1
S4
2
1C(1CL,1CR)
2M(2ML,2MR)
30
S5
47
Pa
S7B
72
40
50
S7R
7
4
S1
S8B
8
S8R
1
S2
5
6
S9B
9
S9R
6c
6b
6f
S3
6a
6d
6e

D (Dg)
D (De)
D (Di)
100
61
63
62
D (Dc)
D (Da)
D (Db)
32A
27a
27b
120R
50A
30A
C2
27
27c
DS
120L
D (Df)
D (Dd)
D (Dh)

WORK MACHINE

CROSS-REFERENCE TO RELATED APPLICATION

The present application is based on and claims priority under 35 U.S.C. § 119 to Japanese Patent Application No. 2023-144305, filed on Sep. 6, 2023, the contents of which are incorporated herein by reference in their entirety.

BACKGROUND

1. Technical Field

The present disclosure relates to work machines.

2. Description of Related Art

There has been known a technology in which a restriction area is displayed on a road surface around heavy construction equipment, and work is carried out while the displayed restriction area is moved along with the movement of the heavy construction equipment.

SUMMARY

According to one aspect of the present disclosure, a work machine includes an attachment and a control device that is configured to specify a hazardous zone in which a degree of hazard increases when an object falls during an operation of the attachment to lift and move the object, and make the specified hazardous zone visually recognizable.

DETAILED DESCRIPTION

According to the above-described technology in the related art, for example, work for lifting an object and moving the object has not been considered. During the work for lifting the object and moving the object, in the event of fall of the lifted object, the object does not necessarily fall within the restricted area. Thus, further improvement in safety is desired.

Therefore, there is a need for improving safety.

Figure 1:
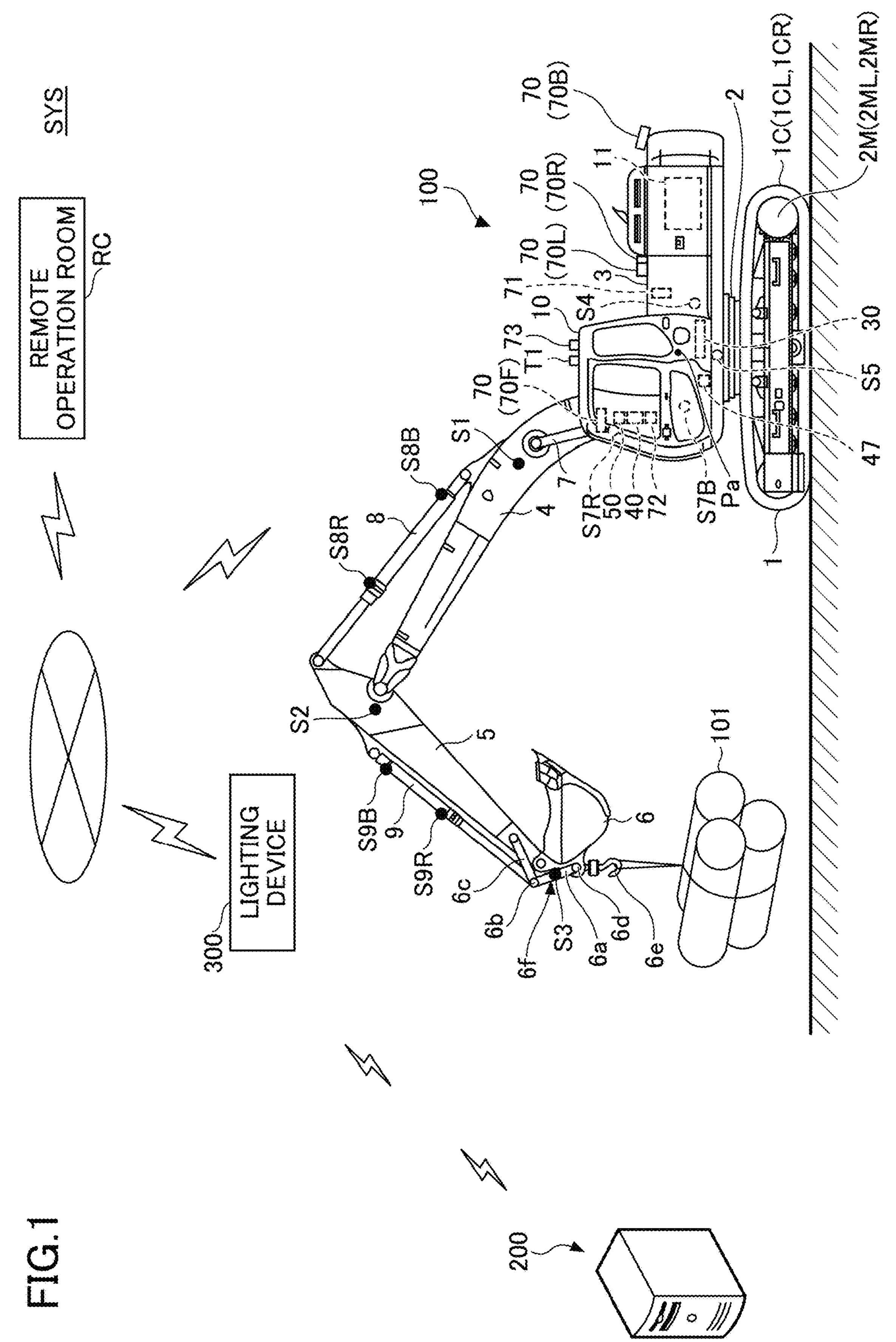
FIG. 1 is a view illustrating one example of a system configuration of a management system of an excavator.

Embodiments of the present disclosure will be described with reference to the accompanying drawings hereinafter. FIG. 1 is a view illustrating one example of a system configuration of a management system of an excavator. The management system SYS of the excavator of the present embodiment includes an excavator 100 and a management apparatus 200. In the following description, the management system SYS of the excavator may be merely referred to as a management system SYS.

In the management system SYS of the present embodiment, the excavator 100 and the management apparatus 200 are connected to each other via a network or the like. The excavator 100 is one example of the work machine. Moreover, the management system SYS of the excavator 100 may include a lighting device 300 and a remote operation room RC.

The management apparatus 200 may be, for example, a cloud server installed outside a work site of the excavator 100, or an edge server or computer terminal installed on the work site of the excavator 100.

The lighting device 300 is connected to the excavator 100 and the management apparatus 200 via a network or the like. The lighting device 300 is configured to emit light, which is visible by workers conducting work in the vicinity of the excavator 100, an operator operating the excavator 100, and the like, in response to illumination commands from the excavator 100 or the management apparatus 200. The lighting device 300 of the present embodiment may be, for example, installed on an aerial craft flying in the sky above the work site, or preinstalled in a position at which light can be emitted to the work site. Moreover, the lighting device 300 may be provided on the excavator 100.

The remote operation room RC is connected to the excavator 100 and the management apparatus 200 via a network or the like. The remote operation room RC may be provided, for example on the same site as the site (facility) where the management apparatus 200 is installed, or may be provided in an area physically set apart from the management apparatus 200. An operation device or the like for remotely controlling the excavator 100 is provided in the remote operation room RC, and remote control of the excavator 100 is achieved by transmitting operation signals generated in the remote operation room RC to the excavator 100.

Specifically, the remote operation room RC is an operator's room different from the cabin 10 of the excavator 100, and the operation device in the remote operation room RC is an external operation device of the excavator 100 disposed outside the excavator 100.

The excavator 100 of the present embodiment is one example of the work machine. FIG. 1 illustrates a side view of the excavator 100 as one example of the work machine.

The excavator 100 according to the present embodiment includes: a lower traveling body 1; an upper rotating body 3 that is rotatably mounted on the lower traveling body 1 via a rotating mechanism 2; operating elements constituting an attachment (work machine), which are a boom 4, an arm 5, and a bucket 6; and a cabin 10.

The lower traveling body 1 causes the excavator 100 to travel by hydraulically driving a pair of left and right crawlers 1C (1CL and 1CR) with traveling hydraulic motors 2M (2ML and 2MR), respectively. Specifically, a pair of the traveling hydraulic motors 2ML and 2MR (an example of traveling motors) drive the lower traveling body 1 (crawler) that is a driven element.

The upper rotating body 3 is driven by a rotary hydraulic motor 2A (see FIG. 2) and rotates relative to the lower traveling body 1. Specifically, the rotary hydraulic motor 2A is a rotary driving element for driving the upper rotating body 3 that is a driven element, and can change the direction of the upper rotating body 3.

The upper rotating body 3 may be electrically driven by an electric motor ("rotary electric motor" hereinafter) instead of the rotary hydraulic motor 2A. Specifically, the rotary electric motor is, similarly to the rotary hydraulic motor 2A, a rotary driving element for driving the upper rotating body 3 that is a driven element, and can change the direction of the upper rotating body 3.

The boom 4 is pivotally attached to the front center of the upper rotating body 3 so as to enable vertical motions. At the tip of the boom 4, the arm 5 is pivotally attached so as to enable up-down and turning motions. The bucket 6 that serves as an end attachment is pivotally attached to the tip of the arm 5 so as to enable up-down and turning motions. The boom 4, the arm 5, and the bucket 6 are hydraulically driven, respectively, by a boom cylinder 7, an arm cylinder 8, and a bucket cylinder 9, which serve as hydraulic actuators.

Note that the bucket 6 is an example of an end attachment, and a different end attachment, such as a slope bucket, a dredging bucket, a breaker, and the like may be attached to the tip of the arm 5, instead of the bucket 6, depending on the nature of work, and the like.

A rod-side end of the bucket cylinder 9 and the bucket 6 are linked together with a bucket link 6*a*. Specifically, the upper end side of the bucket link 6*a* is rotatably connected to the rod-side end of the bucket cylinder 9 and the arm link 6*c* via a bucket cylinder top pin 6*b*. The bottom end side of the bucket link 6*a* is rotatably connected to a bracket on the back surface of the bucket 6 via a bucket pin 6*d*. Moreover, a hook 6*e* for crane work is attached to the bucket link 6*a* in a manner such that the hook 6*e* can be stored and rotated.

During excavation work, the hook 6*e* is stored in a hook storage 6*f*, the majority of which is formed by the bucket link 6*a*. This is to prevent the movement of the bucket 6 from being hindered by the hook 6*e*. During crane work, the hook 6*e* is arranged such that the tip of the hook 6*e* protrudes from the hook storage 6*f*.

Moreover, a detection device (not illustrated) for detecting a storage state of the hook 6*e* may be provided to the hook storage 6*f*. For example, the detection device is a switch which is in a conductive state when the hook 6*e* is inside the hook storage 6*f* and is in a cutoff state when the hook 6*e* is not inside the hook storage 6*f*, and is provided in the hook storage 6*f* where the hook 6*e* is to be stored. Note that, detection signals of the detection device are input to the below-described controller 30.

The cabin 10 is the driver's room where the operator boards, and is mounted on the front left side of the upper rotating body 3.

The excavator 100 runs the actuators (e.g., hydraulic actuators) in accordance with operations by the operator in the cabin 10 to drive the moving elements (driven elements) such as the lower traveling body 1, upper rotating body 3, boom 4, arm 5, bucket 6, and the like.

Also, the excavator 100 may run the hydraulic actuators automatically, regardless of the details of operation by the operator. By this means, the excavator 100 implements a function to allow at least some of the moving elements such as the lower traveling body 1, upper rotating body 3, boom 4, arm 5, bucket 6, and the like, to move automatically (hereinafter referred to as "automatic driving function" or "machine control function").

The automatic driving function may include a function (referred to as "semi-automatic driving function") to allow moving elements (actuators) other than the moving element (actuator) that is being or targeted to be operated, to move automatically in accordance with the operator's operation of the operation device 26 or remote operation. Also, the automatic driving function may include a function (referred to as "fully-automatic driving function") to allow at least part of the driven elements (actuators) to run automatically, on the premise that the operation device 26 is not operated or remotely operated by the operator.

In the excavator 100, when the fully-automatic driving function is enabled, the cabin 10 may be unmanned. Also, the automatic driving function may include a function ("gesture operation function") to allow the excavator 100 to recognize the gestures of people around the excavator 100 such as workers, and enable at least part of the driven elements (hydraulic actuators) to run automatically depending on the details of the recognized gestures.

Also, the semi-automatic driving function, the fully-automatic driving function, and the gesture operation function may include a mode in which the details of movement of the moving element (hydraulic actuator) subject to automatic driving are determined automatically according to rules determined in advance. Also, the semi-automatic driving function, the fully-automatic driving function, and the gesture operation function may include a mode (referred to as "autonomous driving function"), in which the excavator 100 autonomously makes various decisions, and in which, based on these decisions, the excavator 100 autonomously determines the details of the movement of the moving element (hydraulic actuator) subject to automatic driving.

The control system of the excavator 100 includes a controller 30, a space recognition device 70, an orientation detection device 71, an information input device 72, a positioning device 73, a display device 40, a sound output device 50, a boom angle sensor S1, an arm angle sensor S2, a bucket angle sensor S3, a body inclination sensor S4, and a rotating angular velocity sensor S5.

The space recognition device 70 is configured to recognize an object that is present in the three-dimensional space around the excavator 100, and measure (calculate) the positional relationship between the space recognition device 70 or the excavator 100 and the recognized object, such as the distance therebetween, and the like. The space recognition device 70 may include, for example, an ultrasonic sensor, a millimeter wave radar, a monocular camera, a stereo camera, a LIDAR (Light Detecting and Ranging), a distance image sensor, an infrared sensor, and the like. The space recognition device 70 may be connected to the controller 30 so that the space recognition device 70 can communicate with the controller 30.

In the present embodiment, the space recognition device 70 includes: a front recognition sensor 70F, which is attached to the front end of the upper surface of the cabin 10; a rear recognition sensor 70B, which is attached to the rear end of the upper surface of the upper rotating body 3; a left recognition sensor 70L, which is attached to the left end of the upper surface of the upper rotating body 3; and a right recognition sensor 70R, which is attached to the right end of the upper surface of the rotating body 3. Also, an upper recognition sensor that recognizes objects in the space above the upper rotating body 3 may be attached to the excavator 100.

The communication device T1 communicates with an external device via predetermined networks including, for example, a mobile communication network using a base station as a terminal, a satellite communications network, Internet network, or the like. The communication device T1 is, for example, a mobile communication module corresponding to a mobile communication standard, such as long term evolution (LTE), 4th Generation (4G), 5th Generation (5G), or the like, or a satellite communications module for connecting to a satellite communications network, or the like.

Moreover, the communication device T1 may be configured to communicate with the remote operation room RC to operate in response to an operation signal received by the communication device T1 from the remote operation room RC. In this case, the excavator 100 may operate the actuators in response to the operation signal to drive moving elements, such as the lower traveling body 1, the upper rotating body 3, the boom 4, the arm 5, the bucket 6, and the like.

In the case where the excavator 100 is remotely operated, the inside of the cabin 10 may be unmanned. Hereinafter, the description will be given on the assumption that the operation of the operator includes the operation of the operator in the cabin 10 performed on the operation device 26, the remote operation of the operator in the remote operation room RC, or both.

The orientation detection device 71 detects information about the relative relationship between the orientation of the upper rotating body 3 and the orientation of the lower traveling body 1 (for example, the rotation angle of the upper rotating body 3 relative to the lower traveling body 1).

The orientation detection device 71 may include, for example, a ground magnetic sensor attached to the lower traveling body 1 and a ground magnetic sensor attached to the upper rotating body 3. Also, the orientation detection device 71 may include a GNSS receiver attached to the lower traveling body 1 and a GNSS receiver attached to the upper rotating body 3.

Also, the orientation detection device 71 may include a rotary encoder, a rotary position sensor, or the like that can detect the rotation angle of the upper rotating body 3 relative to the lower traveling body 1, that is, the above-mentioned rotating angular velocity sensor S5, and that may be attached to a center joint provided in association with the rotating mechanism 2 that allows relative rotation between the traveling body 1 and the upper rotating body 3.

Also, the orientation detection device 71 may include a camera that is attached to the upper rotating body 3. In this case, the orientation detection device 71 may perform existing image processing on images (input images) captured by the camera attached to the upper rotating body 3, thereby detecting images of the lower traveling body 1 included in the input images.

Then, by using existing image recognition techniques and detecting images of the lower traveling body 1, the orientation detection device 71 may specify the longitudinal direction of the lower traveling body 1, and determine the angle formed between the direction of the front-rear axis of the upper rotating body 3 and the longitudinal direction of the lower traveling body 1. At this time, the direction of the front-rear axis of the upper rotating body 3 can be determined from the position where the camera is mounted. In particular, since the crawler 1C protrudes from the upper rotating body 3, the orientation detection device 71 can identify the longitudinal direction of the lower traveling body 1 by detecting images of the crawler 1C.

Note that, in the event the upper rotating body 3 is structured to be driven in rotary motion by an electric motor instead of the rotary hydraulic motor 2A, a resolver may be used as the orientation detection device 71.

The information input device 72 is provided within the reach of the operator seated in the cabin 10, receives various kinds of operational input from the operator, and outputs signals, which matches the operational input, to the controller 30. For example, the information input device 72 may include a touch panel that is mounted on a display of a display device that displays images of a variety of information.

The controller 30 is an arithmetic logic unit that executes various calculations. In the present embodiment, the controller 30 is constructed using a microcomputer including a central processing unit (CPU) and one or more memories. The CPU executes one or more programs stored in the one or more memories to implement various functions of the controller 30 according to instructions of the one or more programs.

Moreover, for example, the information input device 72 may include button switches, levers, toggles, and the like provided around the display device 40. Also, the information input device 72 may include knob switches provided in the operation device 26. Signals that match the details of operations entered through the information input device 72 input to the controller 30.

Moreover, the information input device 72 may include a mode changeover switch for switching an operation mode of the excavator 100. The operation mode means a type of work performed by the excavator 100, and includes, for example, a crane mode, a normal operation mode, and the like. The operation mode of the excavator 100 will be described in detail later.

The mode changeover switch may be a software switch on a touch panel arranged on the screen of the display device 40, or a hardware switch disposed in the periphery of the display device 40, or a switch disposed at another position in the cabin 10.

The positioning device 73 is configured to measure the position and orientation of the upper rotating body 3. The positioning device 73 is, for example, a global navigation satellite system (GNSS) compass, and detects the position and orientation of the upper rotating body 3. Detection signals indicating the position and orientation of the upper rotating body 3 are input to the controller 30. Among the functions of the positioning device 73, the function of detecting the orientation of the upper rotating body 3 may be performed by an orientation sensor attached to the upper rotating body 3 instead of the positioning device 73.

The display device 40 is provided in a position where the operator seated in the cabin 10 can see the display device 40 with ease, and displays images of a variety of information under the control of the controller 30. The display device 40 may be connected to the controller via an in-vehicle communication network, such as a controller area network (CAN), or may be connected to the controller 30 via a one-to-one dedicated line.

The sound output device 50 is, for example, provided in the cabin 10, is connected to the controller 30, and outputs sound under the control of the controller 30. The sound output device 50 is, for example, a speaker, a buzzer, or the like. The sound output device 50 outputs a variety of information through sound in response to sound output commands from the controller 30.

The boom angle sensor S1 is attached to the boom 4, and calculates the elevation angle of the boom 4 ("boom angle" hereinafter) relative to the upper rotating body 3, such as, for example, the angle that the straight line connecting between the fulcrum points at both ends of the boom 4 forms with respect to the rotating plane of the upper rotating body 3 in side view. The boom angle sensor S1 may include, for example, a rotary encoder, an acceleration sensor, a 6-axis sensor, an inertial measurement unit (IMU), and the like, and the same applies to an arm angle sensor S2, a bucket angle sensor S3, and a body inclination sensor S4 hereinafter. Detection signals indicating the boom angle transmitted from the boom angle sensor S1 are input to the controller 30.

The arm angle sensor S2 is attached to the arm 5, and detects a rotation angle of the arm 5 relative to the boom 4 ("arm angle" hereinafter), such as, for example, the angle that the straight line connecting between the fulcrum points at both ends of the boom 4 forms with respect to the straight line connecting between the fulcrum points at both ends of the arm 5 in side view. Detection signals indicating the arm angle transmitted from the arm angle sensor S2 are input to the controller 30.

The bucket angle sensor S3 is attached to the bucket 6, and detects the rotation angle of the bucket 6 relative to the arm 5 ("bucket angle" hereinafter), such as, for example, the angle that the straight line connecting between the fulcrum points at both ends of the arm 5 forms with respect to the straight line connecting between the fulcrum point and the tip (cutter edge) of the bucket 6 in side view. Detection signals indicating the bucket angle transmitted from the bucket angle sensor S3 are input to the controller 30.

The body inclination sensor S4 detects the tilt of the body (for example, the upper rotating body 3) with respect to the horizontal surface. The body inclination sensor S4 is, for example, attached to the upper rotating body 3, and calculates the tilting angles of the excavator 100 (that is, the upper rotating body 3) about the two axes in the front-rear direction and the left-right direction (hereinafter referred to as "front-rear tilting angle" and "left-right tilting angle"). The body inclination sensor S4 may be, for example, an acceleration sensor, a gyro sensor (angular velocity sensor), a 6-axis sensor, an IMU, and so forth. A detection signal from the body inclination sensor S4, indicating the tilting angles (the front-rear tilting angle and the left-right tilting angle), is taken into the controller 30.

The rotating angular velocity sensor S5 is attached to the upper rotating body 3, and outputs detection information about the rotating state of the upper rotating body 3. The rotating angular velocity sensor S5 detects, for example, the rotating angular velocity and rotating angle of the upper rotating body 3. The rotating angular velocity sensor S5 may include, for example, a gyro sensor, a resolver, a rotary encoder, and the like.

In the case where the body inclination sensor S4 includes a gyro sensor, 6-axis sensor, IMU, and the like that can detect the angular velocity about 3 axes, the rotating state (for example, the rotating angular velocity) of the upper rotating body 3 may be detected based on detection signals from the body inclination sensor S4. In this case, the rotating angular velocity sensor S5 may be omitted.

A boom rod pressure sensor S7R and a boom bottom pressure sensor S7B are attached to the boom cylinder 7. An arm rod pressure sensor S8R and an arm bottom pressure sensor S8B are attached to the arm cylinder 8. A bucket rod pressure sensor S9R and a bucket bottom pressure sensor S9B are attached to the bucket cylinder 9.

The boom rod pressure sensor S7R, the boom bottom pressure sensor S7B, the arm rod pressure sensor S8R, the arm bottom pressure sensor S8B, the bucket rod pressure sensor S9R, and the bucket bottom pressure sensor S9B are also collectively referred to as a "cylinder pressure sensor."

The boom rod pressure sensor S7R detects the pressure in a rod-side oil chamber of the boom cylinder 7 (referred to as "boom rod pressure" hereinafter). The boom bottom pressure sensor S7B detects the pressure in a bottom-side oil chamber of the boom cylinder 7 (referred to as "boom bottom pressure" hereinafter).

The arm rod pressure sensor S8R detects the pressure in a rod-side oil chamber of the arm cylinder 8 (referred to as "arm rod pressure" hereinafter). The arm bottom pressure sensor S8B detects the pressure in a bottom-side oil chamber of the arm cylinder 8 (referred to as "arm bottom pressure" hereinafter).

The bucket rod pressure sensor S9R detects the pressure in a rod-side oil chamber of the bucket cylinder 9 (referred to as "bucket rod pressure" hereinafter). The bucket bottom pressure sensor S9B detects the pressure in a bottom-side oil chamber of the bucket cylinder 9.

Next, the operation mode of the excavator 100 of the present embodiment will be described. The operation mode of the excavator 100 of the present embodiment includes, for example, a crane mode and a normal operation mode.

In the crane mode, the controller 30 sets the rotational speed of the engine 11 to a predetermined rotational speed. Specifically, in the crane mode, the rotational speed of the engine 11 is set lower than the rotational speed of the engine 11 in the normal operation mode to perform excavation work.

Therefore, the operation speed of the actuator is restricted in the crane mode in comparison with the normal operation mode. For example, the rotational speed of the upper rotating body 3 when the rotation operation lever (not illustrated) is operated in the crane mode is restricted to be slower than the rotational speed of the upper rotating body 3 when the rotation operation lever is operated by the same operation amount in the normal operation mode. The same applies to the operating speed of the left traveling hydraulic motor 2ML, the right traveling hydraulic motor 2MR, the boom 4, the arm 5, and the bucket 6.

Moreover, the controller 30 is configured to prevent the bucket 6 from opening up in the crane mode. Specifically, the controller 30 is configured such that the pilot pressure does not reach the control valve 174 even when the bucket 6 is operated to open. As a result, the bucket 6 does not move toward the opening side.

The excavator 100 of the present embodiments mainly performs work of lifting and moving an object in the crane mode. At this time, the excavator 100 of the present embodiment specifies a hazardous zone in consideration of a case where the lifted object falls, and the hazardous zone is illuminated with light of a predetermined color by the lighting device 300.

Specifically, as the operation of lifting and moving a suspended load 101 is started in the crane mode, the controller 30 specifies a hazardous zone, and instructs the lighting device 300 to illuminate the hazardous zone. The process of specifying a hazardous zone by the controller 30 will be described in detail later.

In the present embodiment, this allows surrounding workers to grasp a hazardous zone in the event that the lifted object falls. According to the present embodiment, the workers are therefore cued to retreat to the safe zone where their safety is ensured, even if the lifted object falls. Thus, safety can be improved.

Figure 2:
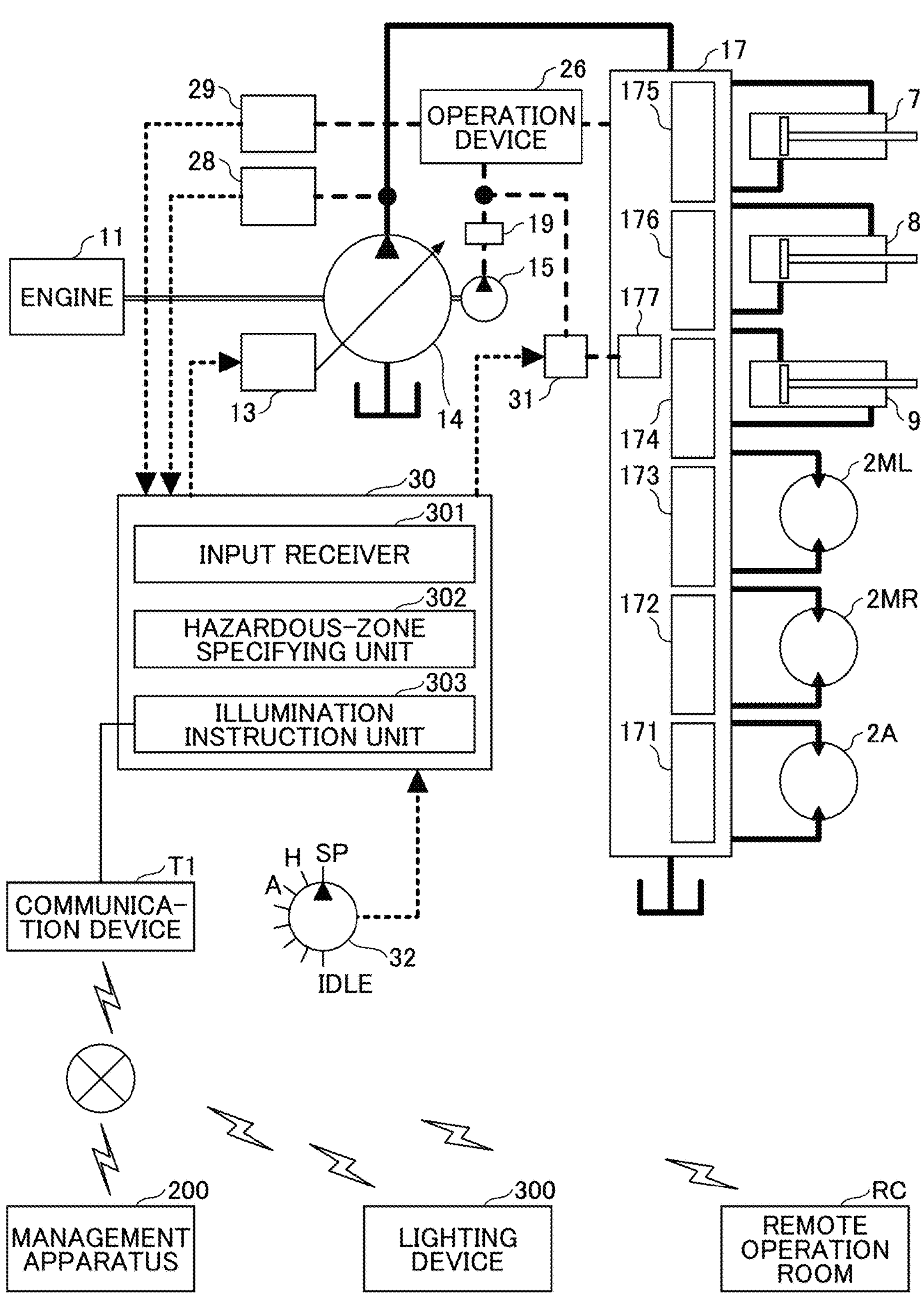
FIG. 2 is a block diagram illustrating a configuration example of a driving system of the excavator.

An example of a structure of a driving system of the excavator 100 will be described with reference to FIG. 2, hereinafter. FIG. 2 is a block diagram illustrating a configuration example of the driving system of the excavator. FIG. 2 depicts a mechanical power transmission system, high pressure hydraulic lines, pilot lines, and an electrical control system with double lines, solid bold lines, dashed lines, and dotted lines, respectively.

The driving system of the excavator 100 mainly includes an engine 11, a regulator 13, a main pump 14, a pilot pump 15, a control valve 17, an operation device 26, discharge pressure sensors 28, an operation pressure sensor 29, a controller 30, a proportional valve 31, a work-mode selection dial 32, and the like.

The engine 11 is the drive source for the excavator. In the present embodiment, the engine 11 is, for example, a diesel engine that runs by maintaining a predetermined rotational speed. Moreover, the output shaft of the engine 11 is linked with input shafts of the main pump 14 and the pilot pump 15.

The main pump 14 is configured to supply a hydraulic oil to the control valve 17 via a high pressure hydraulic line. In the present embodiment, the main pump 14 is a swash-plate variable displacement hydraulic pump.

The regulator 13 is configured to control a discharge amount from the main pump 14. In the present embodiment, the regulator 13 adjusts a tilting angle of the swash plate of the main pump 14 in response to the control command from the controller 30 to control the discharge amount from the main pump 14.

The pilot pump 15 is configured to supply hydraulic oil to various hydraulic control devices (e.g., the operation device 26 and the proportional valve 31) via the pilot lines. In the present embodiment, the pilot pump 15 is a fixed displacement hydraulic pump.

The control valve 17 is a hydraulic control device configured to control a hydraulic system of the excavator. The control valve 17 includes control valves 171 to 176, and a bleed valve 177. The control valve 17 can selectively supply the hydraulic oil, which is discharged by the main pump 14, to hydraulic actuators through the control valves 171 to 176.

The control valves 171 to 176 are configured to control a flow rate of the hydraulic oil from the main pump 14 to the hydraulic actuator, and a flow rate of the hydraulic oil from the hydraulic actuator to the hydraulic oil tank. The hydraulic actuators include a boom cylinder 7, an arm cylinder 8, a bucket cylinder 9, a left traveling hydraulic motor 2ML, a right traveling hydraulic motor 2MR, and a rotary hydraulic motor 2A.

The bleed valve 177 is configured to control a flow rate (referred to "bleed flow rate" hereinafter) of the hydraulic oil flown into the hydraulic oil tank, out of the hydraulic oil discharged from the main pump 14, without passing through the hydraulic actuators. The bleed valve 177 may be disposed outside the control valve 17.

The operation device 26 is a device that an operator uses to control the hydraulic actuators. In the present embodiment, the operation device 26 is configured to supply the hydraulic oil, which is discharged from the pilot pump 15, to pilot ports of the control valves corresponding to the hydraulic actuators, respectively, via the pilot lines. The pressure (pilot pressure) of the hydraulic oil supplied to each of the pilot ports is the pressure according to the direction and amount of the operation of the lever or pedal (not illustrated) of the operation device 26 corresponding to each hydraulic actuator.

The discharge pressure sensor 28 is configured to detect the discharge pressure of the main pump 14. In the present embodiment, the discharge pressure sensor 28 outputs the detected value to the controller 30.

The operation pressure sensor 29 is configured to detect the details of the operation performed on the operation device 26 by the operator. In the present embodiment, the operation pressure sensor 29 detects an operated direction and amount of the lever or pedal of the operation device 26 corresponding to each hydraulic actuator as pressure (operation pressure), and outputs the detected values to the controller 30. The details of the operation performed on the operation device 26 may be detected by sensors other than the operation pressure sensor.

The controller 30 is a control unit configured to control the entire excavator 100. The details of functions of the controller 30 of the present embodiment will be described later.

The proportional valve 31 operates in response to a control command output from the controller 30. In the present embodiment, the proportional valve 31 is an electromagnetic valve that adjusts the secondary pressure introduced from the pilot pump 15 to the pilot port of the bleed valve 177 in the control valve 17 in response to the electric current command output from the controller 30. For example, the proportional valve 31 operates such that the secondary pressure introduced into the pilot port of the bleed valve 177 increases as the electric current command increases.

The work-mode selection dial 32 is a dial for the operator to select a work mode, and enables switching among different work modes. Moreover, the data indicating the set state of the rotational speed of the engine or the set state of acceleration and deceleration characteristics corresponding to the work mode is constantly transmitted from the work-mode selection dial 32 to the controller 30.

The work-mode selection dial 32 is configured to switch the work mode to one of several levels including an SP mode, an H mode, an A mode, and an IDLE mode. Specifically, the work-mode selection dial 32 of the present embodiment can switch the setting condition of the excavator 100.

The SP mode is one example of a first mode, and the H mode is one example of a second mode. Moreover, FIG. 2 illustrates a state where the SP mode is selected by the work-mode selection dial 32.

The SP mode is a work mode selected when a work load is prioritized, and uses the highest rotational speed of the engine and the highest acceleration and deceleration characteristics. The H mode is a work mode selected when it is desired to achieve both a work load and fuel efficiency, and uses the second highest rotational speed of the engine, and the second highest acceleration and deceleration characteristics.

The A mode is a work mode selected when it is desired to soften acceleration characteristics and deceleration characteristics of the hydraulic actuators corresponding to the lever operation, improve accurate operability and safety, and operate the excavator with low noise. The A mode uses the third highest rotational speed of the engine and the third highest acceleration and deceleration characteristics. The IDLE mode is a work mode selected when the engine 11 is desired to be in a low idling state, and uses the lowest rotational speed of the engine and the lowest acceleration and deceleration characteristics.

When the operation of each actuator is stopped during the time when the engine is driven in each work mode (high idling state), the controller 30 is configured to maintain the set rotational speed of the engine 11 for each work mode. As the high idling state is continued for a predetermined period, the controller 30 may switch the rotational speed of the engine to a low idling state. The idling state includes a high idling state and a low idling state.

In the above description, the names of the respective levels of the work mode are assigned as the SP mode, the H mode, the A mode, and the IDLE mode, but the names of the respective levels are not limited to the above names. For example, the SP mode, the H mode, the A mode, and the IDLE mode may be named as a POWER mode, a STD mode, an ECO mode, and an IDLE mode (low idling state). The work mode is not limited to the work mode of the present embodiment, and may be set to have five or more levels.

The engine 11 is controlled at a constant rotational speed corresponding to the rotational speed of the engine for the work mode set by the work-mode selection dial 32. Moreover, the opening of the bleed valve 177 is controlled according to the bleed valve opening characteristics for the work mode set by the work-mode selection dial 32.

Next, functions of the controller 30 of the present embodiment will be described. The controller 30 of the present embodiment includes an input receiver 301, a hazardous-zone specifying unit 302, and an illumination instruction unit 303.

The input receiver 301 receives input of information used for specifying a hazardous zone by the hazardous-zone specifying unit 302. The hazardous-zone specifying unit 302 specifies a hazardous zone using the information received by the input receiver 301. The hazardous zone of the present embodiment is a zone in which a degree of hazard increases when a lifted object falls in the crane mode of the excavator 100. More specifically, the hazardous zone is a zone having a high probability of coming into contact with the fallen object when the lifted object falls. A process of the hazardous-zone specifying unit 302 will be described in detail later.

Moreover, the hazardous-zone specifying unit 302 may specify a caution zone and a safety zone in addition to the hazardous zone. The caution zone is a zone having a probability of coming into contact with a fallen object although the probability of the caution zone is lower than the probability of the hazardous zone. The safety zone is a zone having a low probability of coming into contact with a fallen object. The caution zone and the safety zone may not be specified. In the present embodiment, only the hazardous zone is specified.

Further, the hazardous-zone specifying unit 302 of the present embodiment may have a function of specifying, as the hazardous zone, a zone in which a degree of hazard increases during a rotating operation of the excavator 100 in a state where the suspended load 101 is not lifted.

The state where the suspended load 101 is not lifted by the excavator 100 is a state where the operation mode of the excavator 100 is a normal operation mode. The zone in which the degree of hazard increases during the rotating operation of the excavator 100 is a zone having a probability of coming into contact with the attachment.

The hazardous-zone specifying unit 302 of the present embodiment may set the hazardous zone in the state where the suspended load 101 is not lifted by the excavator 100 as a first zone, and the hazardous zone in the state where the suspended load 101 is lifted by the excavator 100 as a second zone having a range different from a range of the first zone. Moreover, the hazardous-zone specifying unit 302 may switch the hazardous zone between the first zone and the second zone depending on whether or not the suspended load 101 is lifted by the excavator 100.

According to the present embodiment, the range of the hazardous zone can be switched according to the operation of the excavator 100 as described above.

The illumination instruction unit 303 outputs an illumination command to the lighting device 300 to make the hazardous zone visually recognizable. The illumination command is a command to illuminate the hazardous zone specified by the hazardous-zone specifying unit 302, and includes information including the hazardous zone specified by the hazardous-zone specifying unit 302.

Moreover, the illumination command of the present embodiment may include information indicating a range of a caution zone and information indicating a range of a safety zone. In the present embodiment, a color of light emitted to the hazardous zone, a color of light emitted to the caution zone, and a color of light emitted to the safety zone may be set in advance. As a hazardous zone, caution zone, safety zone are specified by the hazardous-zone specifying unit 302, the illumination instruction unit 303 of the present embodiment may output an illumination command, which includes information indicating a range of each zone, and information indicating a color of light emitted to each zone, to the lighting device 300.

Specifically, the illumination command of the present embodiment may include information indicating respective ranges of the hazardous zone, the caution zone, and the safety zone, and information indicating respective colors of light emitted to the hazardous zone, the caution zone, and the safety zone.

Figure 3:
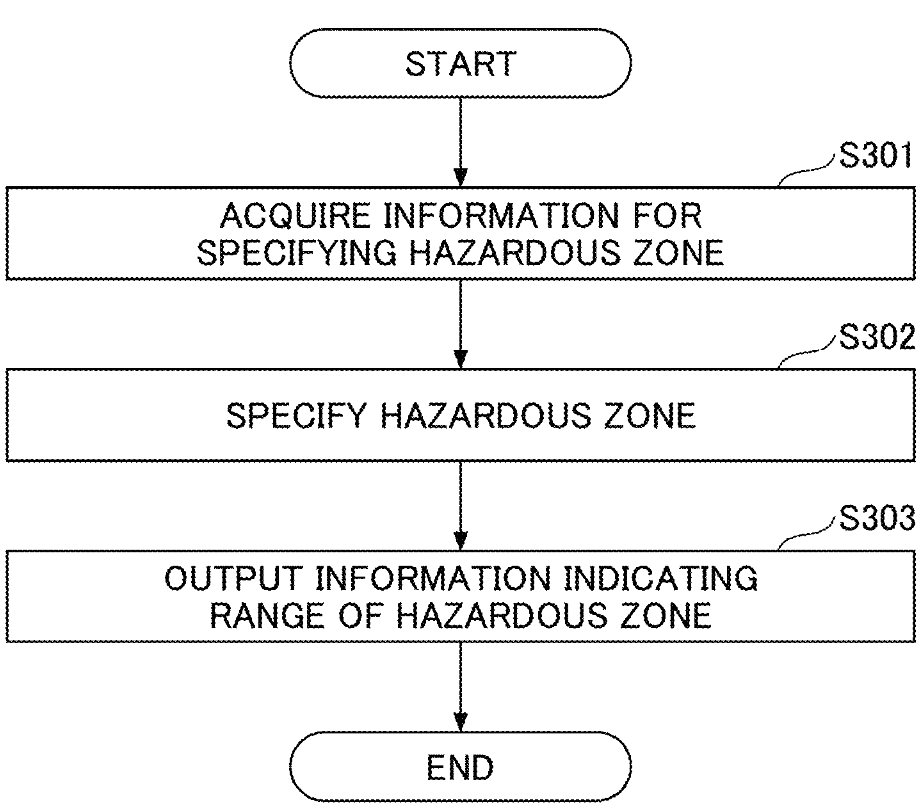
FIG. 3 is a flowchart describing a process performed by a controller of the excavator.

Next, a process of the controller 30 of the present embodiment will be described with reference to FIG. 3. FIG. 3 is a flowchart of a process of the controller of the excavator.

As an operation of the excavator 100 in a crane mode is started, the controller 30 of the present embodiment allows the input receiver 301 to receive input of information used for specifying a hazardous zone (Step S301).

Subsequently, the controller 30 allows the hazardous-zone specifying unit 302 to specify a hazardous zone using the information received by the input receiver 301 (Step S302). In this step, the hazardous-zone specifying unit 302 may also specify a caution zone and a safety zone.

A process of the hazardous-zone specifying unit 302 will be described. The hazardous-zone specifying unit 302 of the present embodiment may specify a hazardous zone, for example, by any of the following three methods.

One method is a method in which a range input through the operation performed by an operator of the excavator 100 or the like is specified as a hazardous zone.

In this case, as an operator or the like performs an operation of setting a range of a hazardous zone using the information input device 72, the input receiver 301 receives input of information indicating the set range. Then, the hazardous-zone specifying unit 302 specifies the set range as a range of a hazardous zone. Moreover, ranges of a caution zone and a safety zone may be set by the operator in this method.

More specifically, the controller 30 may retain image data indicating a bird's-eye-view per work site. Upon selection of the work site, the controller 30 may allow the display device 40 to display bird's-eye-view image data indicating a bird's-eye-view image of the selected work site.

Specifically, the controller 30 may allow the display device 40 to display an input screen including the bird's-eye-view image of the selected work site. As the input receiver 301 receives the setting of the range as a hazardous zone on the bird's-eye-view image, the information indicating the set range may be transmitted to the hazardous-zone specifying unit 302 as information indicating the range of the hazardous zone.

Since an operator sets a hazardous zone in the present embodiment, the hazardous zone can be specified without processing performed by the controller 30 so that a process load of the controller 30 can be reduced.

Another method is a method in which information regarding a suspended load 101 and information indicating terrain of a work site are analyzed to specify a range having a probability of coming into contact with the fallen suspended load 101 as a hazardous zone. In this case, the hazardous-zone specifying unit 302 functions as an analyzer configured to analyze a range as a hazardous zone using the information regarding a suspended load 101 and the information indicating terrain of the work site. The information regarding the suspended load 101 refers to, in other words, characteristics of the suspended load 101.

In this case, the input receiver 301 receives input of the information regarding the suspended load 101 and the information indicating the terrain of the work site.

Specifically, the input receiver 301 receives input of information indicating a length and weight of the suspended load 101 (characteristics of the suspended load 101). Moreover, the input receiver 301 acquires, as the information indicating the terrain of the work site, information indicating a distance (height) from the suspended load 101 to a place where workers are working, and image data indicating an image of the work site captured by an imaging device serving as the space recognition device 70.

The length and weight of the suspended load 101, and the height from the suspended load 101 to the place where the workers are working are output by an operator or the like in advance. In the present embodiment, as the excavator 100 is set in a crane mode, for example, an input screen for inputting a length and weight of the suspended load 101 may be displayed on the display device 40.

The input screen may include, for example, an input field for inputting a length and weight of the suspended load 101, and an input field for inputting a height from the suspended load 101 to the place where the workers are working.

Moreover, the controller 30 may retain information indicating a list of types of suspended load 101, and the input screen may display the list for selecting a type of the suspended load 101. As a type of the suspended load 101 is selected from the list, the input receiver 301 may transmit the information indicating the type of the suspended load 101 together with the length and weight of the suspended load 101 to the hazardous-zone specifying unit 302. Specifically, the information regarding the suspended load 101 may include information indicating the type of the suspended load 101. The types of the suspended load 101 may include, for example, a log, a steel frame, a metal plate, and the like.

In the information indicating the list of the type of the suspended load 101, a type of the suspended load 101 and an index value indicating how easily the suspended load 101 rolls may be associated with each other in advance. The index value indicating how easily the suspended load 101 rolls may be, for example, an value indicating that it is more likely to roll as a shape of the suspended load 101 is closer to a cylinder, and that is it less likely to roll as the shape of the suspended load 101 is closer to a quadrangular prism.

As the type of the suspended load 101 is selected, the input receiver 301 may transmit the index value indicating the easiness of rolling corresponding to the selected type to the hazardous-zone specifying unit 302. Specifically, the information regarding the suspended load 101 may include the index value indicating the easiness of rolling according to the type of the suspended load 101. Moreover, the information regarding the suspended load 101 may include information indicating the number of the suspended loads 101 lifted at a time.

Upon receiving the input of the information regarding the suspended load 101 and information indicating the terrain of the work site, the hazardous-zone specifying unit 302 performs analysis (simulation) on the way the suspended load 101 rolls when the suspended load 101 falls at the work site. Then, the hazardous-zone specifying unit 302 specifies a zone having a probability of coming into contact with the fallen suspended load 101 when the suspended load 101 falls, based on the result of the analysis.

More specifically, the hazardous-zone specifying unit 302 may construct a virtual space reproducing an environment in the vicinity of the excavator 100 from the information indicating the terrain of the work site, the information regarding the suspended load 101, and operation information indicating an operation state of the excavator 100, and simulate a way the suspended load 101 falls using the virtual space to specify a hazardous zone.

A hazardous zone can be specified with high accuracy through the simulation using the virtual space as described above.

Moreover, the hazardous-zone specifying unit 302 specifies a caution zone and a safety zone from the result of the analysis. Specifically, the hazardous-zone specifying unit 302 may specify a range that includes the hazardous zone and a certain range from the outer periphery of the hazardous zone as a caution zone. Moreover, the hazardous-zone specifying unit 302 may specify a zone in which a probability of coming into contact with the fallen suspended load 101 is lower than a predetermined value as a caution zone. Moreover, the hazardous-zone specifying unit 302 may specify a certain range from the outer periphery of the caution zone as a safety zone.

Moreover, the hazardous-zone specifying unit 302 may set a point on a ground surface as a center of hazardous, caution, and safety zones to specify the hazardous zone, the caution zone, and the safety zone. The ground point is determined by an intersection of an imaginary line extending from the hook 6*e* of the excavator 100 in the direction of gravity. Moreover, the hazardous-zone specifying unit 302 can set a ground point as the center of hazardous, caution, and safety zones. The ground point is determined by the intersection of the ground with an imaginary line extending from the hook 6*e* at the end of the excavator's 100 fully extended arm in the direction of gravity.

The specified zone may be specified as a two dimensional zone on the ground surface, or as a three-dimensional space. The hazardous-zone specifying unit 302 may determine, for example, whether or not an object that is preferably not in contact with the suspended load 101 is present around the excavator 100 based on the image data input as the information indicating the terrain of the work site, and in the case where the corresponding object is present, specify a hazardous zone as a three-dimensional space. The object that is preferably not in contact with the suspended load 101 may be, for example, a building, equipment, another work machine, a vehicle, or the like.

In the present embodiment, a hazardous zone can be appropriately specified according to the state of the work site and the suspended load 101 by specifying the hazardous zone based on the information regarding the suspended load 101 and the information indicating the terrain of the work site as described above.

Yet another method is a method in which a hazardous zone is specified using a learned model that estimates a way the suspended load 101 falls. In this case, the hazardous-zone specifying unit 302 includes a learned model and functions as an estimation unit that estimates a way the suspended load 101 falls using the learned model.

The estimation of the way of falling is, for example, estimation of a way the fallen suspended load 101 rolls after landed on the ground surface, or estimation of a trajectory of the falling suspended load 101 until the falling suspended load 101 reaches the ground surface.

In this case, the input receiver 301 receives input of the image data of the suspended load 101 and the image data of the work site. The image data of the suspended load 101 and the image data of the work site may be both captured by an imaging device serving as the space recognition device 70.

As the excavator 100 is set in a crane mode, in the present embodiment, the input receiver 301 may, for example, automatically acquire the image data of the suspended load 101 and the image data of the work site captured by the imaging device serving as the space recognition device 70.

In the present embodiment, the image data of the suspended load 101 and the image data of the work site may not be input separately, and image data including an image of the suspended load 101 and an image of the work site may be input.

Specifically, the image data may be, for example, acquired by the imaging device attached to an aerial craft serving as the lighting device 300 and input to the input receiver 301.

In this case, as the excavator 100 is set in the crane mode, the controller 30 may transmit a request of acquiring image data to the aerial craft. Upon receiving the request, the aerial craft may acquire image data of the work site including the excavator 100 in the state where the suspended load 101 is lifted using the image device attached to the aerial craft, and transmit the image data to the excavator 100.

The input receiver 301 receives the input of the image data transmitted from the aerial craft, and transmit the image data to the hazardous-zone specifying unit 302.

As the hazardous-zone specifying unit 302 acquires the image data from the input receiver 301, the hazardous-zone specifying unit 302 inputs the acquired image data to the learned model and acquires information indicating a range to be a hazardous zone from the learned model.

The learned model will be described. In the present embodiment, the learned model is a learned model that has learned a relationship between a combination of the suspended load 101 and the work site and a zone (hazardous zone) having a high probability of coming into contact with the fallen suspended load 101 using, as a data set, the image data of the suspended load 101, the image data of the work site, and the image data indicating a state of the work site after the suspended load 101 falls.

The hazardous-zone specifying unit 302 of the present embodiment retains the above learned model, inputs image data of the suspended load 101 and the work site to the learned model, and acquires information indicating a range to be a hazardous zone output from the learned model.

The learned model of the present embodiment may specify, for example, a caution zone and a safety zone in addition to the hazardous zone, and may output information indicating a range of each zone.

In the present embodiment, as described above, a hazardous zone in a case where the suspended load 101 falls can be specified using the learned model merely by acquiring the image data of the suspended load 101 and the work site, and therefore the hazardous zone can be easily specified with high accuracy.

Moreover, as the excavator 100 is set in a normal operation mode, not a crane mode, the hazardous-zone specifying unit 302 may set a center of rotating of the excavator 100 as a center to specify a hazardous zone, caution zone, and safety zone, and allow the lighting device 300 to illuminate each zone. The case where the operation mode of the excavator 100 is not the crane mode may be a state where the suspended load 101 is not suspended from the hook 6*e* (a state where an object is not lifted).

As the operation mode of the excavator 100 is switched from the normal operation mode to the crane mode, the hazardous-zone specifying unit 302 of the present embodiment may switch the hazardous zone, caution zone, and safety zone to zones having, as the center thereof, a point on the ground surface at which an imaginary line extending from the hook 6*e* in the direction of gravity intersects with the ground surface.

In other words, when the state of the excavator 100 changes from the state where the suspended load 101 is not lifted to the state where the suspended load 101 is lifted, the hazardous-zone specifying unit 302 of the present embodiment can switch each of the hazardous zone, the caution zone, and the safety zone from a zone (first zone) having the rotating center of the excavator 100 as a center to a zone (second zone) having, as a center, a point on the ground surface defined by an intersection of an imaginary line extending from the hook 6*e* in the direction of gravity.

The lighting device 300 may switch zones to illuminate according to switching of the hazardous zone, the caution zone, and the safety zone.

As described above, the ranges of the hazardous zone, caution zone, safety zone are switched according to the state of the excavator 100 so that workers can grasp each zone changes according to the nature of the work of the excavator 100.

Once the hazardous zone is specified as described above in Step S302, the controller 30 of the present embodiment allows the illumination instruction unit 303 to output an illumination command including the information indicating the range of the hazardous zone to the lighting device 300 (Step S303). In this step, the output illumination command may include information indicating ranges of a caution zone and safety zone, and information indicating a color of light emitted to each zone.

As described above, the controller 30 of the present embodiment specifies a hazardous zone in a case where a suspended load 101 falls during an operation of lifting and moving the suspended load 101, and makes the specified hazardous zone visually recognizable.

Accordingly, in the present embodiment, workers working around the excavator 100 enable visually recognition of a hazardous zone and are cued to retreat from the hazardous zone. Moreover, the controller 30 of the excavator 100 of the present embodiment may stop the operation of the excavator 100, for example, when an object, such as a person or the like, is detected in the caution zone or hazardous zone. This can enhance the safety of the work.

Figure 4:
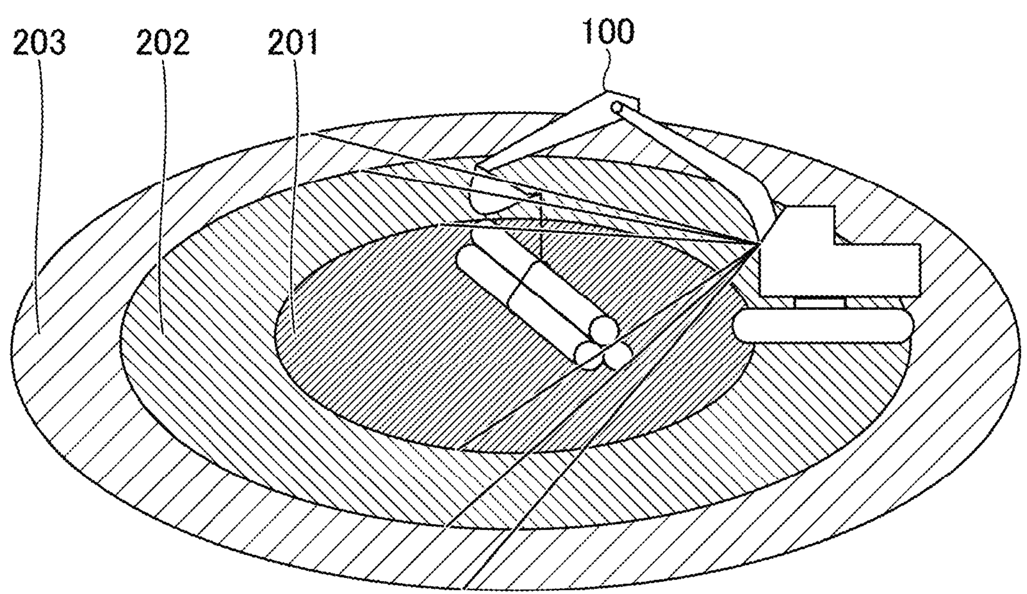
FIG. 4 is a view illustrating one example of a illumination method using a lighting device.

Next, a illumination method using the lighting device 300 will be described with reference to FIGS. 4 and 5. FIG. 4 is a view illustrating one example of illumination method using the lighting device.

FIG. 4 illustrates a illumination method when the lighting device 300 is an aerial craft. In the example of FIG. 4, the hazardous zone 201, the caution zone 202, and the safety zone 203 are illuminated with mutually different colors of light. Specifically, the hazardous zone 201 may be red, the caution zone 202 may be yellow, and the safety zone 203 may be green. In the present embodiment, each zone is illuminated with a different color of light to be visually recognizable as described above, thus workers working around the excavator 100 can grasp whether they are in a safe area or not.

Figure 5:
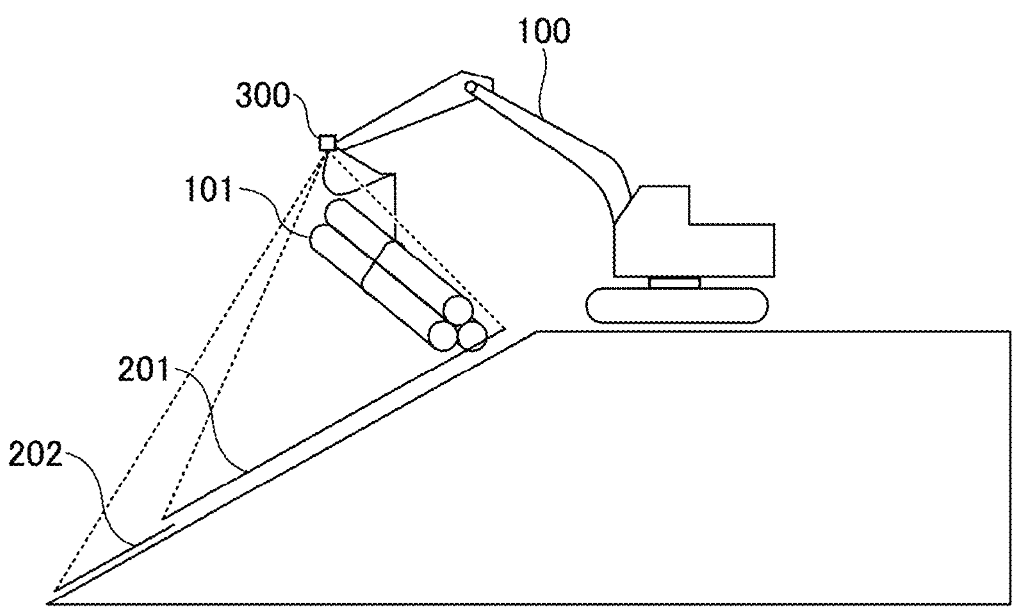
FIG. 5 is a view illustrating another example of a illumination method using the lighting device.

FIG. 5 is another view illustrating one example of a illumination method using the lighting device. In the example of FIG. 5, a case where the lighting device 300 is provided near the bucket link 6*a* of the excavator 100 is illustrated. Moreover, FIG. 5 illustrates a state where the point on the ground surface at which an imaginary line from the hook 6*e* in the direction of gravity intersects with the ground is inclined. In this case, as the suspended load 101 falls, the fallen suspended load 101 rolls down the inclined ground surface, and therefore a majority of the inclined ground surface is specified as a hazardous zone 201.

In the present embodiment, a hazardous zone can be specified according to the terrain of the work site as described above.

Moreover, the excavator 100 of the present embodiment allows the display device 40 to display the hazardous zone, caution zone, and safety zone specified by the hazardous-zone specifying unit 302.

A display example of the display device 40 of the excavator 100 will be described with reference to FIGS. 6 and 7 hereinafter. In the following description, the display example of the display device 40 when the operation mode of the excavator 100 is switched from the normal operation mode to the crane mode will be described.

Figure 6:
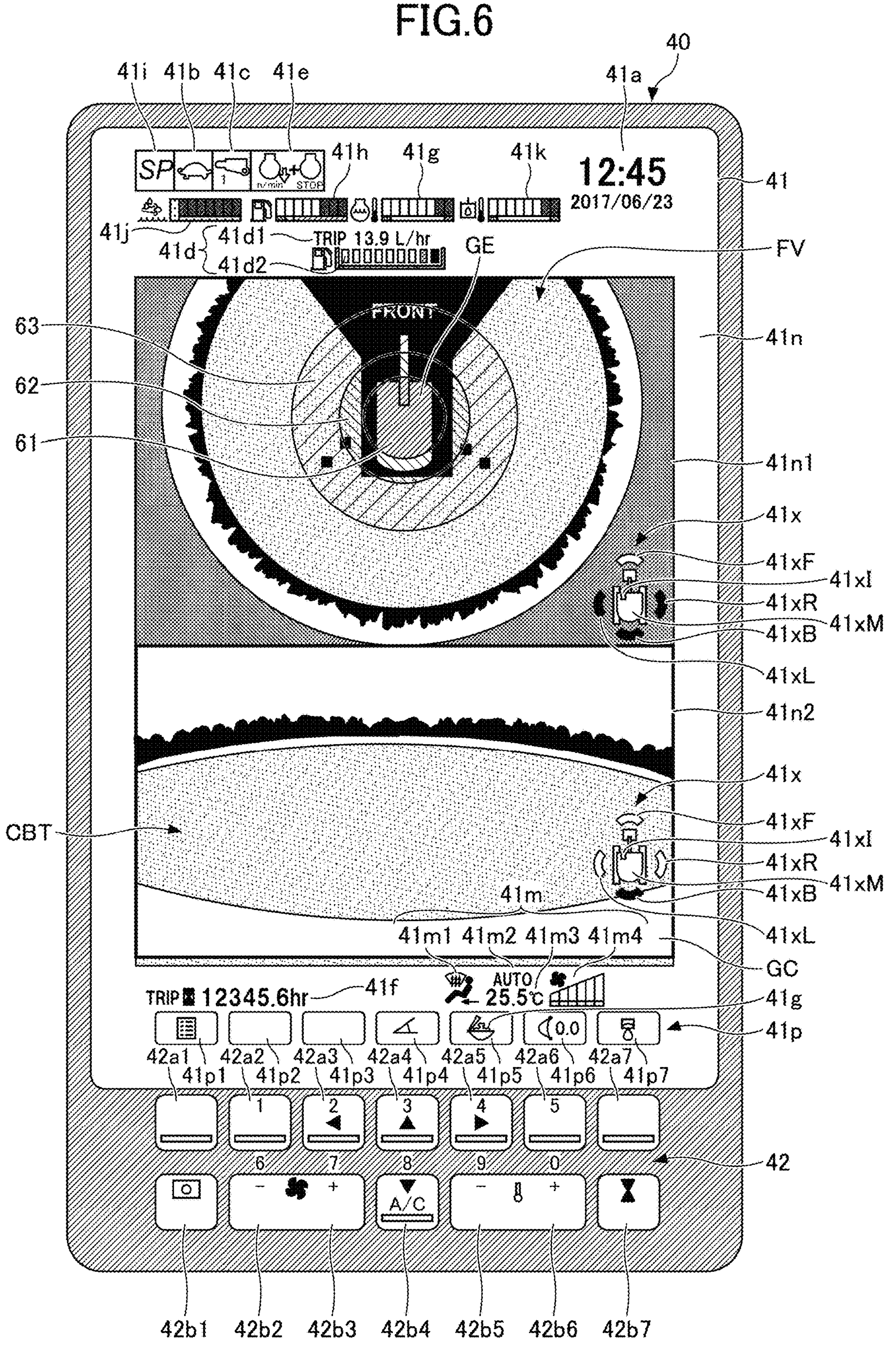
FIG. 6 is a view illustrating a display example of a display device when an operation mode of the excavator is a normal operational mode.

FIG. 6 is a view illustrating a display example of the display device when the operation mode of the excavator is a normal operation mode. In other words, FIG. 6 illustrates the display example of the display device in the state where the excavator 100 is not lifting the suspended load 101.

The display device 40 illustrated in FIG. 6 includes an image display 41 and an input device 42. The image display 41 is a display on which various images are displayed. The input device 42 may be a part of the information input device 72. In FIG. 6, a main screen is displayed on the image display 41.

First, the image display 41 will be described. As illustrated in FIG. 6, The image display 41 includes a date and time display field 41*a*, a travel-mode display field 41*b*, an attachment display field 41*c*, a fuel consumption display field 41*d*, an engine-control-state display field 41*e*, an engine-operation-time display field 41*f*, a coolant-temperature display field 41*g*, a remaining-fuel-amount display field 41*h*, a rotational-speed-mode display field 41*i*, a remaining-urea-water-amount display field 41*j*, a hydraulic-oil-temperature display field 41*k*, an air-conditioner-operation-state display field 41*m*, an image display field 41*n*, and a menu display field 41*p*.

The travel-mode display field 41*b*, the attachment display field 41*c*, the engine-control-state display field 41*e*, the rotational-speed-mode display field 41*i*, and the air-conditioner-operation-state display field 41*m* are fields for displaying setting state information that is information regarding the setting state of the excavator 100. The fuel consumption display field 41*d*, the engine-operation-time display field 41*f*, the coolant-temperature display field 41*g*, the remaining-fuel-amount display field 41*h*, the remaining-urea-water-amount display field 41*j*, and the hydraulic-oil-temperature display field 41*k* are fields for displaying an operational state information that is information regarding an operational state of the excavator 100.

Specifically, the date and time display field 41*a* is a field for displaying the current time and date. The travel-mode display field 41*b* is a field for displaying the current travel mode. The attachment display field 41*c* is a field for displaying an image depicting the currently attached attachment. The fuel consumption display field 41*d* is a field for displaying fuel consumption information calculated by the controller 30. The fuel consumption display field 41*d* includes an average fuel consumption display field 41*d*1 for displaying overall-average fuel consumption or interval-average fuel consumption, and an instantaneous fuel consumption display field 41*d*2 for displaying instantaneous fuel consumption.

The engine-control-state display field 41*e* is a field for displaying a control state of the engine 11. The engine-operation-time display field 41*f* is a field for displaying a cumulative operation time of the engine 11. The coolant-temperature display field 41*g* is a field for displaying a current temperature state of the engine coolant. The remaining-fuel-amount display field 41*h* is a field for displaying a state of a remaining amount of the fuel in the fuel tank.

The rotational-speed-mode display field 41*i* is a field for displaying the current rotational speed mode set by the work-mode selection dial 32 as an image. The remaining-urea-water-amount display field 41*j* is a field for displaying a state of a remaining amount of the urea water in the urea water tank as an image. The hydraulic-oil-temperature display field 41*k* is a field for displaying a temperature state of the hydraulic oil in the hydraulic oil tank.

The air-conditioner-operation-state display field 41*m* includes an air-outlet display field 41*m*1 for displaying the current position of the air outlet, an operation-mode display field 41*m*2 for displaying the current operation mode, a temperature display field 41*m*3 for displaying the currently set temperature, and an air-volume display field 41*m*4 for displaying the currently set air volume.

The image display field 41*n* is a field for displaying an image captured by the imaging device S6. In the example of FIG. 6, the image display field 41*n* displays a bird's-eye-view image FV and a rear view image CBT. The bird's-eye-view image FV is, for example, a virtual viewpoint image generated by a display controller 66, and generated based on images captured by a rear camera S6B, a left camera S6L, and a right camera S6R.

Moreover, an excavator figure GE corresponding to the excavator 100 is arranged in a central position of the bird's-eye-view image FV. This is for allowing the operator to intuitively grasp the positional relationship between the excavator 100 and an object existing in the vicinity of the excavator 100. The rear view image CBT is an image depicting a space behind the excavator 100, and also includes an image GC of the counterweight. The rear view image CBT is a real viewpoint image generated by a controller 40*a*, and is generated based on an image captured by the rear camera S6B.

Moreover, the image display field 41*n* includes a first image display field 41*n*1 provided at an upper side and a second image display field 41*n*2 provided at a lower side. In the example of FIG. 6, the bird's-eye-view image FV is arranged in the first image display field 41*n*1, and the rear view image CBT is arranged in the second image display field 41*n*2. However, the image display field 41*n* may be configured such that the bird's-eye-view image FV is arranged in the second image display field 41*n*2 and the rear view image CBT is arranged in the first image display field 41*n*1.

In the example of FIG. 6, the bird's-eye-view image FV and the rear view image CBT are arranged to be next to each other in the up-down direction, but may be arranged in a manner such that a gap is interposed between the bird's-eye-view image FV and the rear view image CBT. In the example of FIG. 6, moreover, the image display field 41*n* is a field that is long in the longitudinal direction, but the image display field 41*n* may be a field that is long in the lateral direction.

In the case where the image display field 41*n* is the laterally long field, the image display field 41*n* may be configured such that the bird's-eye-view image FV is arranged on the left side as the first image display field 41*n*1, and the rear view image CBT is arranged on the right side as the second image display field 41*n*2. In this case, a gap may be inserted between the left field and the right field, and the positions of the bird's-eye-view image FV and the rear view image CBT may be switched.

In the present embodiment, moreover, an icon image 41*x* is displayed on each of the first image display field 41*n*1 and the second image display field 41*n*2. The icon image 41*x* is an image representing a relative relationship between the position of the imaging device S6 and the orientation of the attachment of the upper rotating body 3.

The icon image 41*x* of the present embodiment includes an image 41*x*M of the excavator 100, an image 41*x*F indicating the front of the excavator 100, and an image 41*x*B indicating the rear of the excavator 100. Moreover, the icon image 41*x* includes an image 41*x*L indicating the left side of the excavator 100, an image 41*x*R indicating the right side of the excavator 100, and an image 41*x*I indicating the inside of the cabin 10.

The images 41*x*F, 41*x*B, 41*x*L, 41*x*R, and 41*x*I correspond to a front camera S6F capturing an image of the front of the excavator 100, a rear camera S6B capturing an image of the rear of the excavator 100, a left camera S6L capturing an image of the left side of the excavator 100, and a right camera S6R capturing an image of the right side of the excavator 100. Moreover, the image 41*x*I corresponds to a camera inside the cabin 10.

In the present embodiment, as one of the images associated with the corresponding cameras is selected on the icon image 41*x*, the image data captured by the camera corresponding to the selected image is displayed on the image display field 41*n*.

In the example of FIG. 6, a display mode of the images 41*x*B, 41*x*L, and 41*x*R is different from the display mode of the images 41*x*F and 41*x*I in the first image display field 41*n*1. Therefore, it is understood that the first image display field 41*n*1 displays the bird's-eye-view image of the image data synthesized from image data captured by the rear camera S6B, left camera S6L, and right camera S6R corresponding to the images 41*x*B, 41*x*L, and 41*x*R, respectively.

In FIG. 6, images depicting the hazardous zone, the caution zone, and the safety zone, respectively, which are specified by the hazardous-zone specifying unit 302, are displayed in the first image display field 41*n*1. Specifically, the image 61 is an image indicating the hazardous zone, the image 62 is an image indicating the caution zone, and the image 63 is an image indicating the safety zone. In the example of FIG. 6, zones indicated by the images 61, 62, and 63, respectively, are zones in each of which a center of the zone is aligned with a rotating center of the excavator 100.

Each of the images 61, 62, and 63 may be, for example, an image obtained by capturing the light emitted from the flying body as the lighting device 300. Moreover, each of the images 61, 62, and 63 may be an image generated by the controller 30 and superimposed on the bird's-eye-view image FV.

Moreover, the display mode of the image 41*x*B is different from the display mode of the images 41*x*F, 41*x*L, 41*x*R, and 41*x*I in the second image display field 41*n*2. Therefore, it is understood that the second image display field 41*n*2 display an image of the image data captured by the rear camera S6B corresponding to the image 41*x*B.

The menu display field 41*p* includes tabs 41*p*1 to 41*p*7. In the example of FIG. 6, the tabs 41*p*1 to 41*p*7 are arranged in the lower most portion of the image display 41 so as to be spaced apart from each other in the left-right direction. Icon images for displaying various kinds of information are displayed in the tabs 41*p*1 to 41*p*7.

The tab 41*p*1 displays a detailed menu item icon image for displaying detailed menu items. As an operator selects the tab 41*p*1, the icon images displayed in the tabs 41*p*2 to 41*p*7 are switched to icon images associated with the detailed menu items.

The tab 41*p*4 displays an icon image for displaying information regarding a digital level. As an operator selects the tab 41*p*4, the rear view image CBT is switched to a screen indicating the information regarding the digital level. However, the screen indicating the information regarding the digital level may be displayed by being superimposed on the rear view image CBT or by reducing the size of the rear view image CBT.

Moreover, the bird's-eye-view image FV may be switched to the screen indicating the information regarding the digital level. In this case, the screen indicating the information regarding the digital level may be displayed by being superimposed on the bird's-eye-view image FV or by reducing the size of the bird's-eye-view image FV.

The tab 41*p*5 displays an icon image for transitioning the main screen displayed on the image display 41 to a loading work screen. As an operator selects the below-described input device 42 corresponding to the tab 41*p*5, the main screen displayed on the image display 41 is transitioned to the loading work screen. At this time, the image display field 41*n* is continuously displayed, and the menu display field 41*p* is switched to a field for displaying the information regarding the loading work.

The tab 41*p*6 displays an icon image for displaying information regarding computerized construction. As an operator selects the tab 41*p*6, the rear view image CBT is switched to a screen indicating the information regarding the computerized construction. However, the screen indicating the information regarding the computerized construction may be displayed by being superimposed on the rear view image CBT or by reducing the size of the rear view image CBT. Moreover, the bird's-eye-view image FV may be switched to the screen indicating the information regarding the computerized construction. In this case, the screen indicating the information regarding the computerized construction may be displayed by being superimposed on the bird's-eye-view image FV, or by reducing the size of the bird's-eye-view image FV.

The tab 41*p*7 displays an icon image for displaying information regarding the crane mode. As an operator selects the tab 41*p*7, the rear view image CBT is switched to a screen indicating the information regarding the crane mode, and the operation mode of the excavator 100 may be switched from the normal operation mode to the crane mode.

In the present embodiment, the screen indicating the information regarding the crane mode may be displayed by being superimposed on the rear view image CBT, or reducing the size of the rear view image CBT. Moreover, the bird's-eye-view image FV may be switched to the screen indicating the information regarding the crane mode. In this case, the screen indicating the information regarding the crane mode may be displayed by being superimposed on the bird's-eye-view image FV, or by reducing the size of the bird's-eye-view image FV.

In the present embodiment, as the operation mode of the excavator 100 is switched from the normal operation mode to the crane mode, the hazardous zone, caution zone, and safety zone displayed in the first image display field 41*n*1 are switched from the zones in each of which the center point of the zone is aligned with the rotating center to zones in each of which the center point of the zone is aligned with a point on the ground surface at which an imaginary line extending from the hook 6*e* in the direction of gravity intersects with the ground surface. The display example of the case where the operation mode of the excavator 100 is the crane mode will be described in detail later.

Icon images are not displayed on the tabs 41*p*2 and 41*p*3. Therefore, there is no change in the images displayed on the image display 41 when an operator operates the tabs 41*p*2 and 41*p*3.

Icon images displayed on the tabs 41*p*1 to 41*p*7 are not limited to the above examples, and icon images for displaying other types of information may be displayed.

Next, the input device 42 will be described. As illustrated in FIG. 6, the input device 42 includes one or multiple button switches with which selection of the tabs 41*p*1 to 41*p*7, input for setting, and the like are performed by an operator.

In the example of FIG. 6, the input device 42 includes seven switches 42*al* to 42*a*7 arranged on the upper row and seven switches 42*b*1 to 42*b*7 arranged on the lower row. The switches 42*b*1 are 42*b*7 arranged below the switches 42*al* to 42*a*7, respectively.

The number, form, and arrangement of the switches of the input device 42 are not limited to the above example. For example, the form may be a form in which functions of multiple button switches are combined as one using a jog wheel, a jog switch, or the like. The input device 42 may be configured as a separate body from the display device 40. Alternatively, the tabs 41*p*1 to 41*p*7 may be directly operated on a touch panel in which the image display 41 and the input device 42 are integrated.

The switches 42*al* to 42*a*7 are arranged below the tabs 41*p*1 to 41*p*7, respectively, to correspond to the tabs 41*p*1 to 41*p*7, and function as switches for selecting the tabs 41*p*1 to 41*p*7, respectively.

Since the switches 42*al* to 42*a*7 are arranged below the tabs 41*p*1 to 41*p*7 to correspond to the tabs 41*p*1 to 41*p*7, respectively, an operator can intuitively select the tabs 41*p*1 to 41*p*7.

In FIG. 6, as the switch 42*al* is operated, for example, the tab 41*p*1 is selected so that the menu display field 41*p* is changed from the single row display to double row display and icon images corresponding to the first menu are displayed on the tabs 41*p*2 to 41*p*7. In response to the change of the menu display field 41*p* from the single row display to the double row display, the size of the rear view image CBT is reduced. At this time, the size of the bird's-eye-view image FV is maintained without being changed, thus visibility is not impaired when the operator checks the surroundings of the excavator 100.

Figure 7:
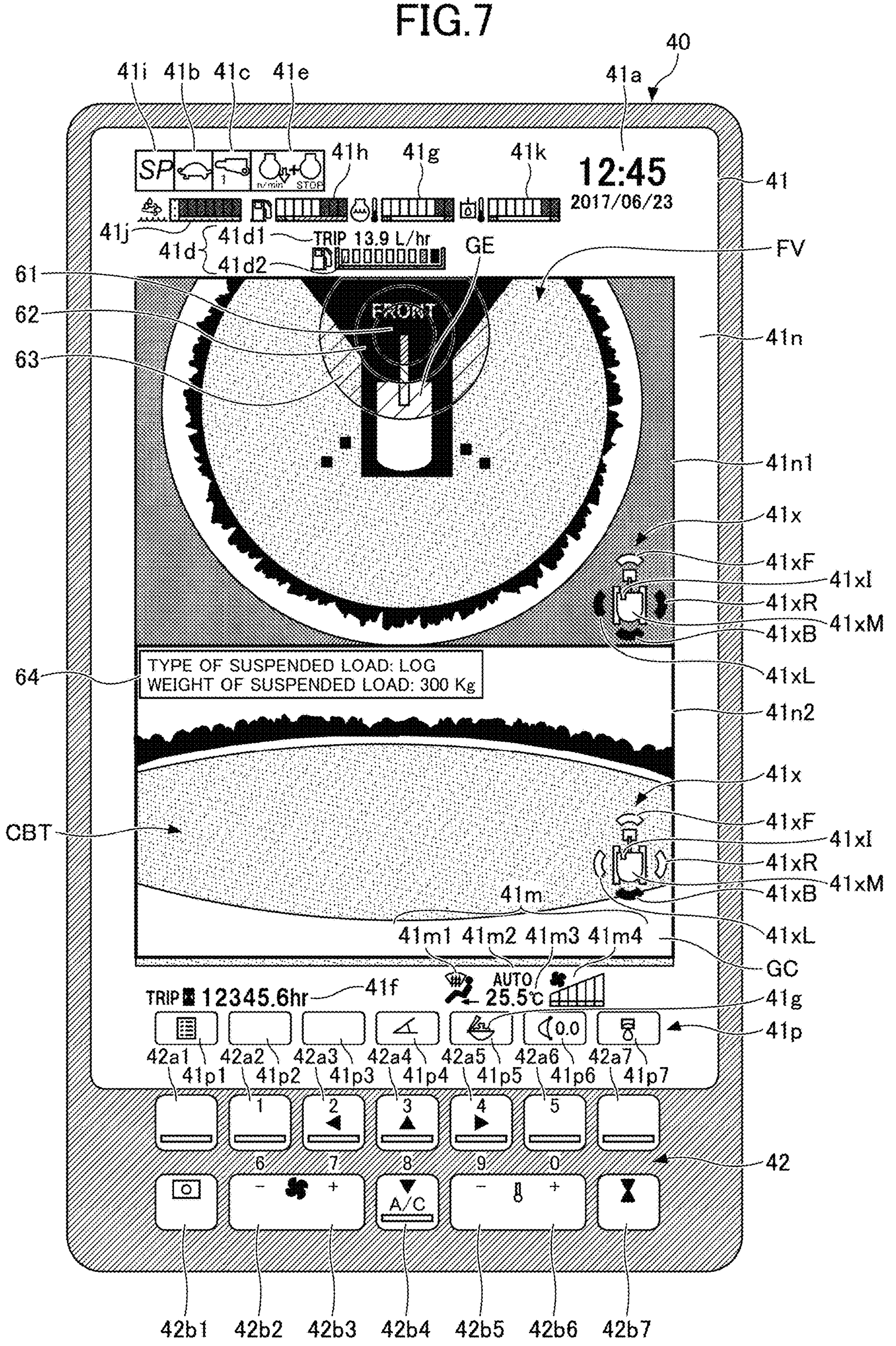
FIG. 7 is a view illustrating a display example of the display device when the operation mode of the excavator is changed from the normal operation mode to a crane mode.

FIG. 7 is a view illustrating a display example of the display device when the operation mode of the excavator is changed from the normal operation mode to the crane mode. In other words, FIG. 7 illustrates the display example of the display device 40 when the state of the excavator 100 is changed from a state where the suspended load 101 is not lifted to a state where the suspended load 101 is lifted.

In FIG. 7, it is understood that the hazardous zone, caution zone, and safety zone in the first image display field 41*n*1 are switched from the zones in each of which the center point of the zone is aligned with the rotating center to the zones in each of which the center point of the zone is aligned with a point on the ground surface at which an imaginary line extending from the hook 6*e* of the excavator 100 in the direction of gravity intersects with the ground.

More specifically, it is understood that the images 61, 62, and 63 are moved to the positions having, as a center point, the point at which an imaginary line extending from the hook 6*e* of the excavator 100 in the direction of gravity intersects with the ground.

Moreover, the second image display field 41*n*2 includes a display field 64 for displaying information regarding the crane mode. The display field 64 displays a type and weight of the suspended load 101 as the information regarding the crane mode. Note that, the display field 64 may display other types of information than the information illustrated in FIG. 7.

In the present embodiment, as the operation mode of the excavator 100 is switched from the normal operation mode to the crane mode, the hazardous zone corresponding to the position of the lifted suspended load 101 in the crane mode can be displayed on the display device 40 as described above.

In the present embodiment, moreover, as the operation mode of the excavator 100 is switched from the crane mode to the normal operation mode, the hazardous zone is returned from the position illustrated in FIG. 7 to the position illustrated in FIG. 6.

Accordingly, in the present embodiment, an operator of the excavator 100 can recognize switching of the hazardous zone depending on the nature of the work of the excavator 100.

Next, a case where the functions of the controller 30 of the present embodiment are provided on a control device of a remote operation room RC, and a hazardous zone, caution zone, and safety zone are displayed on the display device of the remote operation room RC will be described with reference to FIG. 8.

Figure 8:
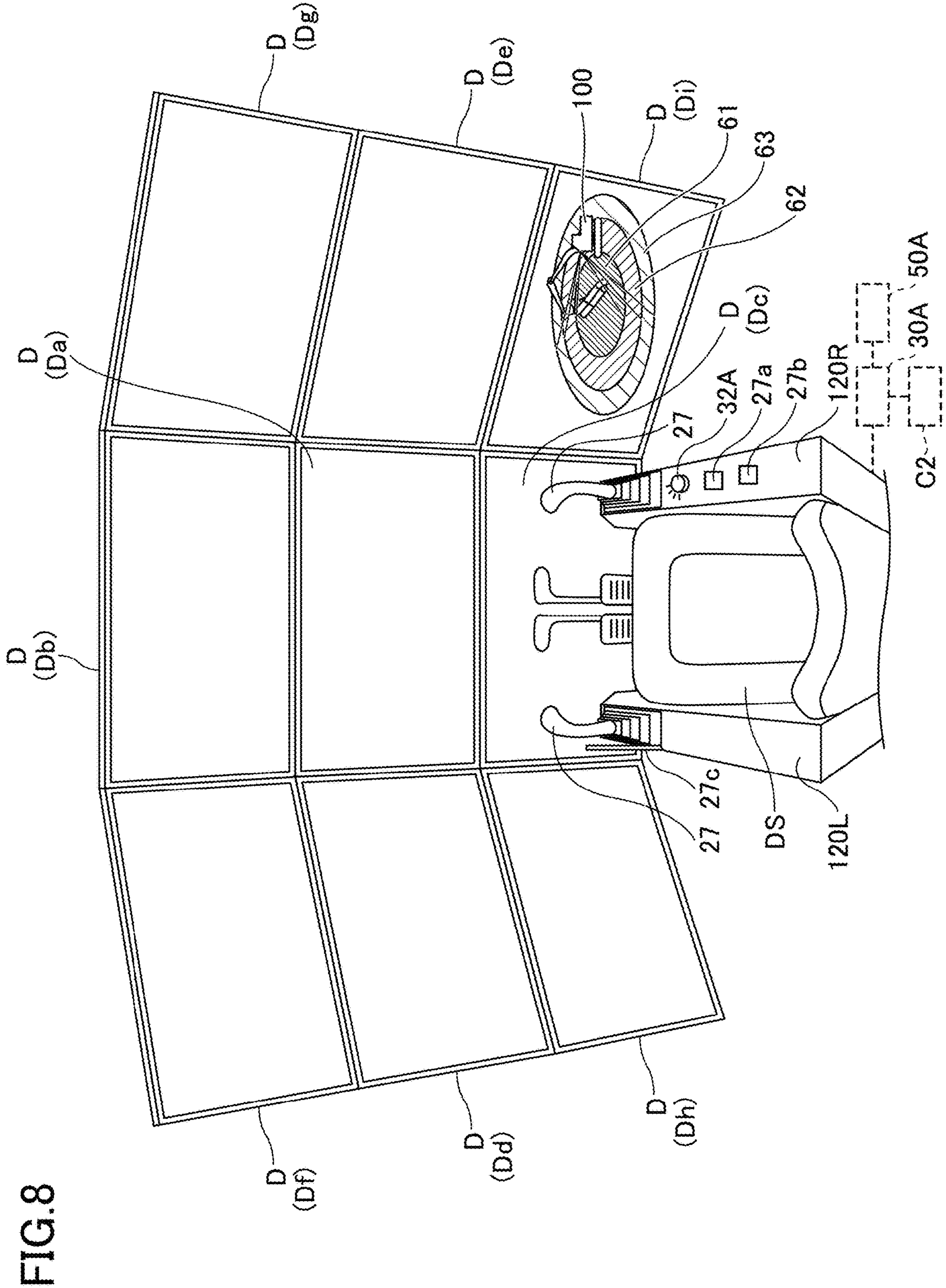
FIG. 8 is a view for describing a remote operation room.

FIG. 8 is a view for explaining the remote operation room. In the remote operation room RC, a remote controller 30A, a sound output device 50A, an indoor imaging device C2, a display device D, a communication device T2, and the like are provided. Moreover, a driver's seat DS on which an operator who remotely operates the excavator 100 is seated is provided in the remote operation room RC.

The remote controller 30A is an arithmetic logic unit that executes various calculations. In the present embodiment, similarly to the controller 30, the remote controller 30A is constructed using a microcomputer including a central processing unit (CPU) and one or more memories. The CPU executes one or more programs stored in the one or more memories to implement various functions of the remote controller 30A.

Moreover, the remote controller 30A of the present embodiment may have functions the controller 30 of the excavator 100 has. Specifically, the remote controller 30A may include an input receiver 301, a hazardous-zone specifying unit 302, and an illumination instruction unit 303.

The sound output device 50A is configured to output sounds. In the present embodiment, the sound output device 50A is a speaker, and is configured to play the sounds collected by a sound collection device attached to the excavator 100.

The indoor imaging device C2 is configured to capture images inside the remote operation room RC. In the present embodiment, the indoor imaging device C2 is a camera disposed inside the remote operation room RC, and is configured to capture images of an operator seated on the driver's seat DS.

A communication device T2 is configured to control wireless communications with a communication device T1 attached to the excavator 100. In the present embodiment, the communication device T1 and the communication device T2 are configured to transmit and receive information via 5th Generation mobile communication line (5G line), an LTE line, a satellite line, or the like.

In the present embodiment, the driver's seat DS has the same configuration as the driver's seat disposed in the cabin 10 of a typical excavator 100. Specifically, a left console box 120L is arranged on the left side of the driver's seat DS, and a right console box 120R is arranged on the right side of the driver's seat DS.

A left operating lever is disposed at a front edge of an upper surface of the left console box 120L, and a right operating lever is disposed at a front edge of the upper surface of the right console box 120R. Moreover, a travel lever and a travel pedal are disposed at the front of the driver's seat DS.

Further, a work-mode selection dial 32A is disposed the center of the upper surface of the right console box 120R. Moreover, an operation switch 27*a* and an operation switch 27*b* are disposed on the upper surface of the right console box 120R.

In the present embodiment, moreover, a remote operation lever 27*c* is disposed in the vicinity of the right console box 120R.

The left operating lever, the right operating lever, the travel lever, the travel pedal, the remote operation lever 27*c*, the work-mode selection dial 32A, and the operation switches 27*a* and 27*b* are all included in the operation device 27.

The work-mode selection dial 32A is a dial for adjusting a rotational speed of the engine 11, and is configured, for example, to switch the engine rotational speed in four levels.

The operation switch 27*a* is an operation member for instructing the remote controller 30A to stop. As the operation switch 27*a* is pressed, the remote controller 30A of the present embodiments generates an operation signal indicating a stopping command for the moving elements of the excavator 100 and transmits the generated operation signal to the excavator 100.

As the controller 30 of the excavator 100 receives this operation signal, a stop command generator 33 generates a stopping command, and the generated stopping command is transmitted to each of the moving elements of the excavator 100.

In the present embodiment, as described above, the operation member for instructing the stop is disposed inside the remote operation room RC, and therefore, the operator in the remote operation room RC can immediately stop the operation of the excavator 100, for example, during the autonomous operation of the excavator 100.

Accordingly, in the present embodiment, for example, even when the operation of the excavator 100 by the autonomous operation is not suitable for the situation of the work site, safety of the work site can be maintained and the safety can be improved.

The operation switch 27*b* is an operation member for switching the operation signal used for the control of the excavator 100 from the operation signal generated within the remote operation room RC to the operation signal generated in the operation device 26 in the cabin 10.

As the operation switch 27*b* is operated, the remote controller 30A may transmit an operation signal including a request for switching to the operation by the operation device 26 in the cabin 10 to the excavator 100. As the controller 30 of the excavator 100 receives this operation signal, the controller 30 of the excavator 100 may be configured to stop receiving operation signals from the remote operation room RC, and to control the moving elements of the excavator 100 according to the operation signal corresponding to the operation in the cabin 10.

In the present embodiment, as described above, the operation member for switching from the remote operation to the operation in the cabin 10 is provided, and therefore the operation of the excavator 100 can be switched from the remote operation to the operation in the cabin 10 based on the decision of the operator in the remote operation room RC.

The remote operation lever 27*c* is an operation member for switching the operation signal used for the control of the excavator 100 from the operation signal generated by the autonomous control function of the controller 30 to the operation signal generated in the remote operation room RC.

In the present embodiment, as the remote operation lever 27*c* is tilted in the remote operation room RC during the autonomous operation of the excavator 100, the remote controller 30A may transmit a request for controlling by the remote operation to the excavator 100. As the controller 30 receive this control request, the controller 30 stops generating an operation signal, and controls the moving elements of the excavator 100 according to the operation signal transmitted from the remote operation room RC.

The display device D is configured to display information regarding a state of the surroundings of the excavator 100. In the present embodiment, the display device D is a multi-display composed of nine monitors arranged in three rows and three columns, and is configured to be able to display the states of the spaces in front of, on the left of, and on the right of the excavator 100. Each monitor is a liquid crystal display monitor, an organic EL display monitor, or the like. The display device D may be composed of a single curved monitor or multiple curved monitors, or may be composed of a projector.

The display device D may be a display device wearable by an operator. For example, the display device D may be a head-mounted display and may be configured to transmit and receive information with the remote controller 30A via wireless communication. The head-mounted display may be wired to the remote controller 30A. The head-mounted display may be a transmissive head-mounted display or a non-transmissive head-mounted display. The head-mounted display may be a monocular head-mounted display or a binocular head-mounted display.

The display device D is configured to display an image in a manner such that the operator in the remote operation room RC can visually recognize the surroundings of the excavator 100. Specifically, the display device D display an image so that the operator can check the state of the surroundings of the excavator 100 as if the operator is inside the cabin 10 of the excavator 100 even though the operator is in the remote operation room RC.

In the present embodiment, the display device D is a multi-display composed of nine monitors arranged in three rows and three columns as illustrated in FIG. 8. Specifically, the display device D includes a central monitor Da, an upper monitor Db, a lower monitor Dc, a left monitor Dd, a right monitor De, an upper left monitor Df, an upper right monitor Dg, a lower left monitor Dh, and a lower right monitor Di.

The central monitor Da is configured to display an image capturing a state of a space in a central range. The upper monitor Db is configured to display an image capturing a state of a space in an upper range. The lower monitor Dc is configured to display an image capturing a state of a space in a lower range. The left monitor Dd is configured to display an image capturing a space in a left range. The right monitor De is configured to display an image capturing a state of a space in a right range. The same applies to the upper left monitor Df, the upper right monitor Dg, the lower left monitor Dh, and the lower right monitor Di.

However, the display device D may be, for example, a multi-display including six monitors arranged in two rows and three columns. In this case, the range of the image displayed on the display device D may be divided into six corresponding to the six monitors, respectively. Alternatively, the display device D may be a multi-display composed of five monitors including a central monitor, an upper monitor, a left monitor, a lower monitor, and a right monitor. In this case, the display of images capturing the states of the upper left range, the upper right range, the lower left range, and the lower right range may be omitted. Alternatively, the display device D may be a multi-display in which multiple monitors are arranged in any other arrangements.

In the above embodiment, the display device D is disposed in front of, on the left front side of, and on the right front side of the operator, but the display device D may be disposed in a square tube shape or cylindrical shape so as to surround the operator. Specifically, the display device D may include a monitor disposed behind the operator. Alternatively, the display device D may be disposed in a hemispherical shape to surround the operator. Specifically, the display device D may include a monitor disposed directly above the operator.

In the present embodiment, moreover, images depicting the excavator 100 to be operated by the remote operation and the hazardous zone, caution zone, and safety zone specified for the excavator 100 may be displayed on any one of the multiple monitors included in the display device D.

In the example of FIG. 8, an image of the excavator 100, an image 61 indicating the hazardous zone, an image 62 indicating the caution zone, and an image 63 indicating the safety zone are displayed on the lower right monitor Di.

In the present embodiment, as described above, the hazardous zone when the object lifted by the excavator 100 falls is displayed on the display device D of the remote operation room RC, and therefore the operator operating in the remote operation room RC can grasp the hazardous zone around the excavator 100 operated by the operator.

Figure 9:
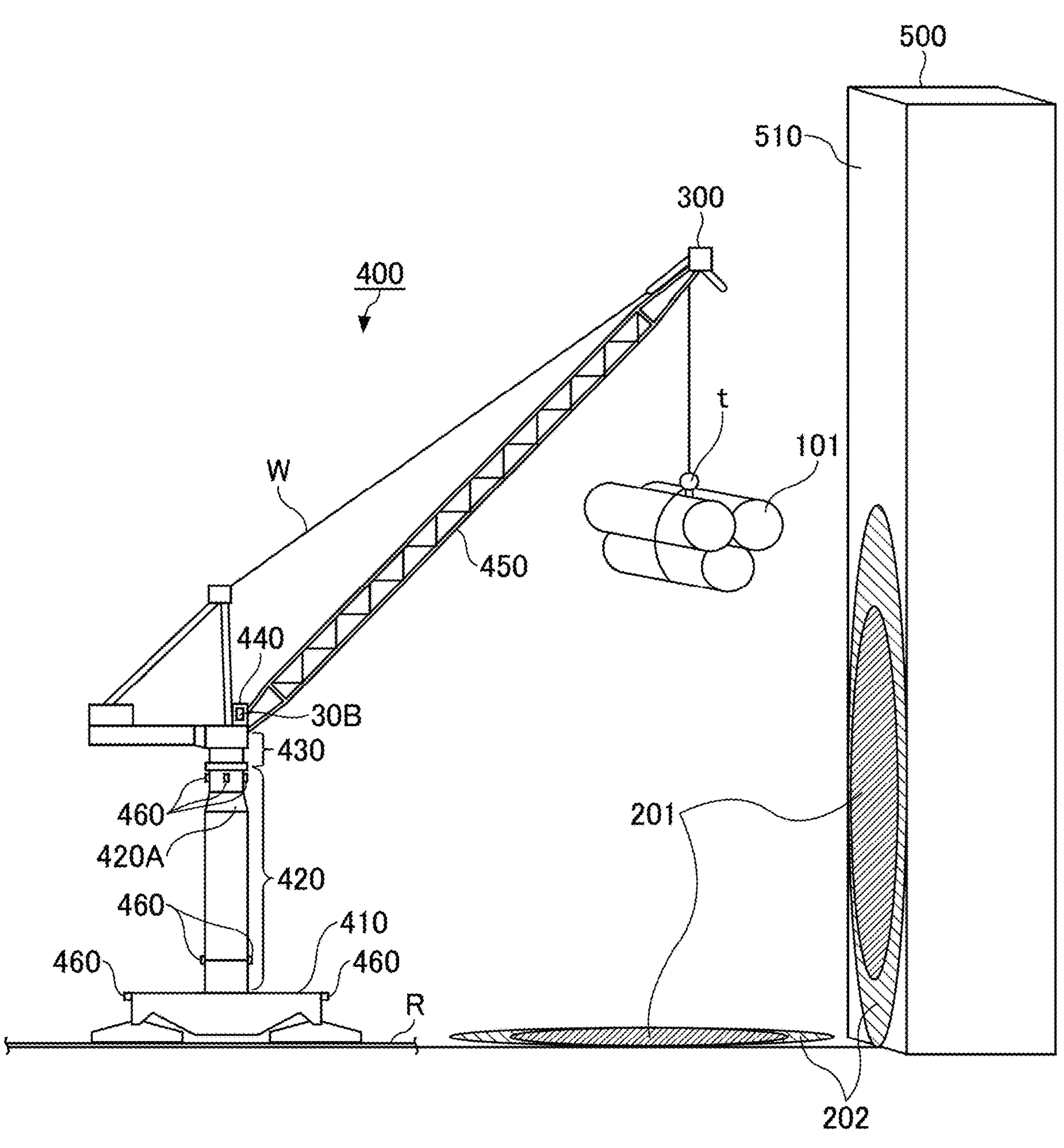
FIG. 9 is a view illustrating one example of a illumination method using the lighting device when the work machine is a traveling crane device.

Next, a case where the work machine is a traveling crane device will be described with reference to FIG. 9. FIG. 9 is a view illustrating a illumination method using the lighting device when the work machine is a traveling crane device.

A traveling crane device 400 illustrated in FIG. 9 includes, for example, a traveling section 410 that travels on a rail R, a fixed section 420 mounted on the traveling section 410, a rotating section 430 rotatably mounted on the fixed section 420, an operation cabin 440 mounted on the rotating section 430, and a jib 450 (attachment) attached to the rotating section 430. The fixed section 420 includes a cylinder 420A at least at the upper portion thereof.

The traveling crane device 400 includes a hoisting accessory t for hoisting a load, a wire lope w for winding up and unwinding the hoisting accessory t, and a drum (not illustrated) for winding up and feeding out the wire lope w. Note that, the drum is coupled to a motor (not illustrated), and is rotated by the driving force of the motor. As the drum winds up the wire lope w, the hoisting accessory t is raised. As the drum feeds out the wire lope w, conversely, the hoisting accessory t is lowered. Specifically, the hoisting accessory t, the wire lope w, and the drum constitute a loading-unloading section that performs operation of loading and unloading a load.

The driving of the traveling section 410 enables the traveling crane device 400 to travel on the rail R. The traveling crane device 400 can travel on the rail R to approach a loading target, and can travel on the rail R in a state where the load is suspended by the hoisting accessory t to transport the load.

The traveling crane device 400 can adjust the position of the hoisting accessory t by raising and lowering the jib 450. Specifically, the hoisting accessory t can be brought close to the crane main body (composed of the traveling section 410 and fixed section 420) by increasing an angle of the jib 450 from the horizontal plane. Conversely, the hoisting accessory t can be moved away from the crane main body by decreasing the angle of the jib 450 from the horizontal plane. Moreover, the traveling crane device 400 can adjust an angle (an angle in a plan view) of the hoisting accessory t with respect to the crane main body as a center by rotating the rotating section 430 relative to the fixed section 420.

In the vicinity of the rail R on which the traveling crane device 400 travels, workers may walk, and trailers or carriages may travel. It is difficult for the operator to visually recognize the surroundings of the traveling section 410 from the operation cabin 440, and to check the workers, trailers, and the like. Therefore, the traveling crane device 400 includes an imaging section 460 for checking the surroundings of the traveling section 410.

Further, in the traveling crane device 400 of the present embodiment, a lighting device 300 is provided at the tip of the jib 450. Moreover, a controller 30B is provided in the operation cabin 440. The controller 30B includes an input receiver 301, a hazardous-zone specifying unit 302, and an illumination instruction unit 303.

In the example of FIG. 9, the traveling crane device 400 performs work in the vicinity of a building 500, and therefore the hazardous-zone specifying unit 302 of the controller 30B specifies a hazardous zone having a high probability of coming into contact with the suspended load 101 when the suspended load 101 falls even on the wall surface 510 of the building 500. Moreover, the hazardous-zone specifying unit 302 of the controller 30B specifies a caution zone 202 having a probability of coming into contact with the fallen suspended load 101 even on the wall surface 510 of the building 500.

The traveling crane device 400 allows the lighting device 300 to illuminate the specified hazardous zone 201 and the caution zone 202 with light of different colors.

In the present embodiment, as described above, light indicating the hazardous zone can be emitted even to the wall surface of the building and the like. In the present embodiment, the workers or the like in the vicinity of the work machine can be therefore visually grasp the hazardous zone when the work machine performs work of lifting and moving an object so that the workers and the like are cued to move a safe place, and safety of the work can be improved.

In the above embodiment, the input receiver 301, the hazardous-zone specifying unit 302, and the illumination instruction unit 303 are described through the example where they are included in the controller 30 of the excavator 100, the remote controller 31A of the remote operation room RC, and the controller 30B of the traveling crane device 400. However, the input receiver 301, the hazardous-zone specifying unit 302, and the illumination instruction unit 303 may be provided in the management apparatus 200.

In this case, one or more programs for implementing the input receiver 301, the hazardous-zone specifying unit 302, and the illumination instruction unit 303 may be installed in the management apparatus 200. The CPU of the management apparatus 200 may load and execute the installed one or more programs to realize functions of respective units.

In the case where the hazardous-zone specifying unit 302 of the management apparatus 200 specifies the range input by the operation performed by an operator or the like of the excavator 100 as a hazardous zone, the input receiver 301 of the management apparatus 200 may receive the information indicating the range of the hazardous zone, which is input by the operation of the operator of the excavator 100, and allows the hazardous-zone specifying unit 302 to specify the hazardous zone.

Note that, the information indicating the range of the hazardous zone may be input by an administrator or the like who operates the management apparatus 200.

Moreover, in the case where the hazardous-zone specifying unit 302 of the management apparatus 200 analyzes a range to be a hazardous zone based on information regarding the suspended load 101 (characteristics of the suspended load 101) and information indicating terrain of the work site, the input receiver 301 receives the information regarding the suspended load 101 and the information indicating the terrain of the work site.

Specifically, the input receiver 301 may acquire, from the excavator 100, the information regarding the suspended load 101 input by the operator of the excavator 100 and the information indicating the terrain of the work site. Moreover, the input receiver 301 may receive input of the information regarding the suspended load 101 and the information indicating the terrain of the work site from an input device of the management apparatus 200.

Moreover, in the case where the hazardous-zone specifying unit 302 of the management apparatus 200 specifies a hazardous zone using a learned model that estimates a way the suspended load 101 rolls, the input receiver 301 may receive input of the image data of the suspended load 101 and the image data of the work site acquired by the excavator 100. Moreover, the input receiver 301 of the management apparatus 200 may acquire image data of the suspended load 101 and image data of the work site, which are directly input to the management apparatus 200.

As described above, in the present embodiment, a processing load of the controller 30 of the excavator 100 can be reduced by identifying a hazardous zone with the management apparatus 200 so that the configuration of the excavator 100 can be simplified.

Moreover, the excavator 100 and the traveling crane device 400 are described as examples of the work machine in the present embodiment, but the work machine is not limited to the excavator 100 and the traveling crane device 400. The work machine of the present embodiment can be applied to any work machine, as long as the work machine is a work machine that can travel while lifting an object, such as forklifts, cranes other than the traveling crane device 400, and the like.

The preferred embodiment has been described in detail above. However, the present disclosure is not limited to the above-described specific embodiment, and various modifications and alterations may be made within the scope of the present disclosure. Moreover, the features described separately can be combined together unless it is technically contradicted.

What is claimed is:

1. A work machine, comprising:
an attachment;
a memory; and
a hardware processor coupled to the memory and configured to
specify a hazardous zone in which a degree of hazard increases when an object falls during an operation of the attachment to lift and move the object, and
visualize the specified hazardous zone by causing a lighting device to illuminate the specified hazardous zone,
wherein the memory stores a learned model which has learned a relationship between a combination of the object and a work site and a zone having a high probability of coming into contact with the fallen object from a data set in which image data of the object, image data of the work site of the work machine, and image data indicating a state of the work site after the object falls are associated with one another, and
the hardware processor is further configured to
input image data including an image of the object and an image of the work site to the learned model; and
specify a zone output from the learned model as the hazardous zone.

2. The work machine according to claim 1, wherein the hazardous zone has the high probability of coming into contact with the fallen object when the object falls.

3. The work machine according to claim 1,
wherein the work machine is an excavator, and
wherein the hardware processor is further configured to:
when an operation mode of the excavator is a normal operation mode, set a zone having a high probability of coming into contact with the attachment of the excavator during a rotating operation of the excavator as a first zone;
when the operation mode of the excavator is a crane mode, set a zone having a high probability of coming into contact with the fallen object during an operation of moving the object lifted by the attachment as a second zone; and
switch a range of the hazardous zone between the first zone and the second zone according to the operation mode of the excavator.

4. The work machine according to claim 1, wherein the hardware processor is further configured to visualize the specified hazardous zone around the work machine in the work site.

5. The work machine according to claim 4, wherein the hardware processor is further configured to visualize the specified hazardous zone on a surface of at least one of a ground or an object around the work machine in the work site.

6. A work machine, comprising:
an attachment;
a memory; and
a hardware processor coupled to the memory and configured to
specify a hazardous zone in which a degree of hazard increases when an object falls during an operation of the attachment to lift and move the object, and
visualize the specified hazardous zone,
wherein the memory stores a learned model which has learned a relationship between a combination of the object and a work site and a zone having a high probability of coming into contact with the fallen object from a data set in which image data of the object, image data of the work site of the work machine, and image data indicating a state of the work site after the object falls are associated with one another, and the hardware processor is further configured to input image data including an image of the object and an image of the work site to the learned model; and specify a zone output from the learned model as the hazardous zone.

7. The work machine according to claim 6, wherein the hazardous zone has the high probability of coming into contact with the fallen object when the object falls.

8. The work machine according to claim 6, wherein the work machine is an excavator, and wherein the hardware processor is further configured to:

when an operation mode of the excavator is a normal operation mode, set a zone having a high probability of coming into contact with the attachment of the excavator during a rotating operation of the excavator as a first zone;

when the operation mode of the excavator is a crane mode, set a zone having a high probability of coming into contact with the fallen object during an operation of moving the object lifted by the attachment as a second zone; and switch a range of the hazardous zone between the first zone and the second zone according to the operation mode of the excavator.

9. The work machine according to claim 6, wherein the hardware processor is further configured to visualize the specified hazardous zone around the work machine in the work site.

10. The work machine according to claim 9, wherein the hardware processor is further configured to visualize the specified hazardous zone on a surface of at least one of a ground or an object around the work machine in the work site.

* * * * *